(12) United States Patent
Ishida et al.

(10) Patent No.: US 7,643,174 B2
(45) Date of Patent: Jan. 5, 2010

(54) SEMICONDUCTOR LASER DRIVE CONTROL DEVICE

(75) Inventors: Tomohito Ishida, Sunto-gun (JP); Isami Itoh, Mishima (JP); Tetsuya Atsumi, Susono (JP); Masatsugu Toyonori, Sunto-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 569 days.

(21) Appl. No.: 11/491,264

(22) Filed: Jul. 24, 2006

(65) Prior Publication Data
US 2007/0024881 A1  Feb. 1, 2007

(30) Foreign Application Priority Data
Jul. 29, 2005  (JP) .............................. 2005-221586

(51) Int. Cl.
*G06K 15/10* (2006.01)
(52) U.S. Cl. ..................... 358/1.9; 358/3.06; 358/1.8
(58) Field of Classification Search ............... 358/1.1, 358/1.7, 1.8, 1.9, 3.01, 3.06, 3.23, 4.12, 4.18, 358/480, 481, 296, 300; 347/111, 112, 131, 347/132, 135, 224, 251, 252, 253, 254
See application file for complete search history.

(56) References Cited

U.S. PATENT DOCUMENTS

| | | | | |
|---|---|---|---|---|
| 4,855,841 A | * | 8/1989 | Shimada ...................... | 358/296 |
| 5,151,973 A | * | 9/1992 | Sasaki et al. ................. | 358/1.9 |
| 5,557,412 A | | 9/1996 | Saito et al. ................... | 358/296 |
| 5,696,594 A | | 12/1997 | Saito et al. ................... | 358/296 |
| 5,999,704 A | * | 12/1999 | Hirao .......................... | 358/2.1 |
| 6,975,427 B1 | * | 12/2005 | Lucky et al. ................. | 358/1.9 |

FOREIGN PATENT DOCUMENTS

| | | |
|---|---|---|
| JP | 6-155800 | 6/1994 |
| JP | 9-116750 | 5/1997 |
| JP | 2698099 B2 | 1/1998 |
| JP | 2000-177171 | 6/2000 |
| JP | 2001-130050 | 5/2001 |
| JP | 2002-361922 | 12/2002 |
| JP | 2002-361925 | 12/2002 |
| JP | 2003-266763 | 9/2003 |
| JP | 2004-122587 | 4/2004 |
| JP | 2006-96008 | 4/2006 |

* cited by examiner

*Primary Examiner*—Thomas D Lee
(74) *Attorney, Agent, or Firm*—Fitzpatrick, Cella, Harper & Scinto

(57) ABSTRACT

The present invention further improves gradation characteristics from a highlight region to a high-density region. First, the correction processing receives image data, and an image attribute discrimination discriminates whether the data are related to a character/thin line or others on the basis of attribute information on a pixel of interest. If it is discriminated that the data are related to a character/thin line, a pattern matching to data stored in a line buffer is performed to obtain a pixel distance, and in accordance with the pixel distance, a correction amount is determined on the basis of an LUT set in a correction amount determination. Subsequently, on the basis of the determined correction amount, corrected image data are generated and output to the following step.

8 Claims, 29 Drawing Sheets

(a) IMAGE PATTERN
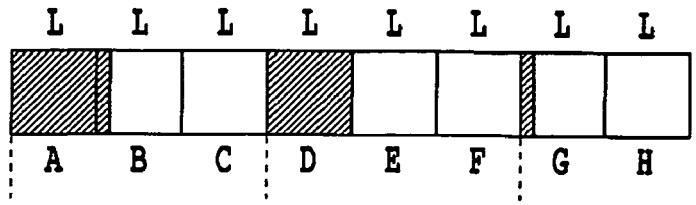
(b) PWM SIGNAL BEFORE CORRECTION
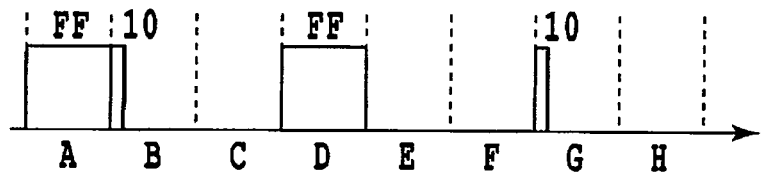
(c) LUT
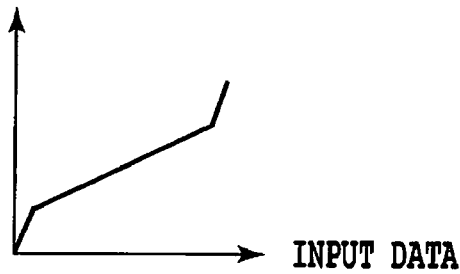
(d) PWM SIGNAL AFTER LUT CORRECTION
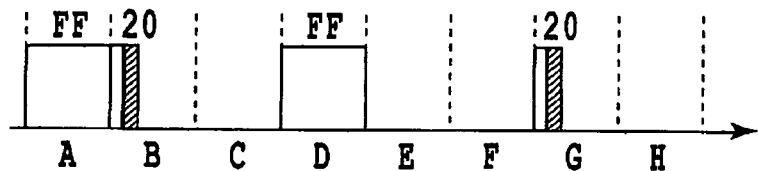
(e) OUTPUT LIGHT WAVEFORM PATTERN
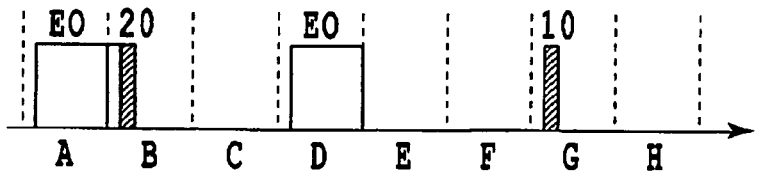
FIG.25

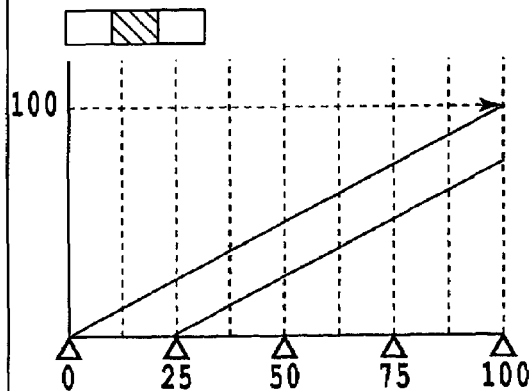
(a) ABSENCE OF LEFT PIXEL / ABSENCE OF RIGHT PIXEL
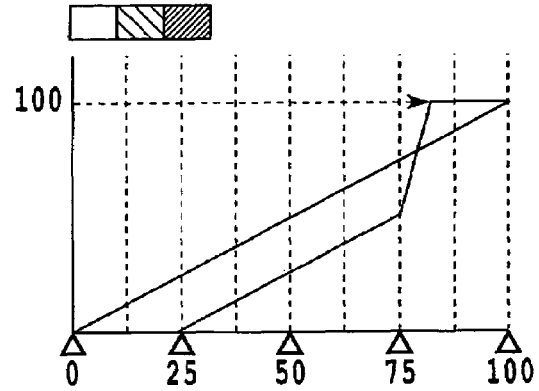
(b) ABSENCE OF LEFT PIXEL / PRESENCE OF RIGHT PIXEL
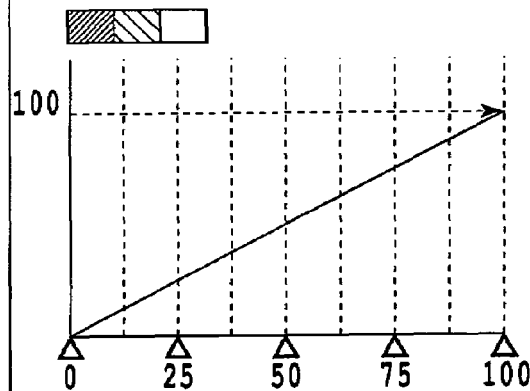
(c) PRESENCE OF LEFT PIXEL / ABSENCE OF RIGHT PIXEL
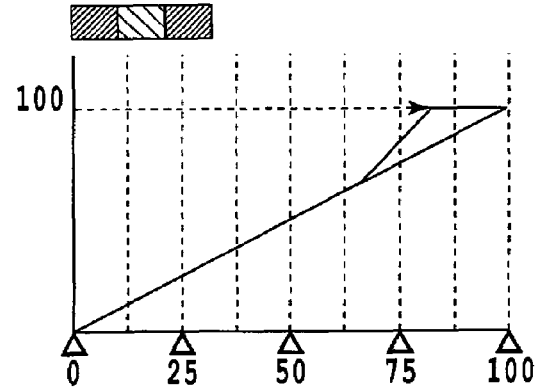
(d) PRESENCE OF LEFT PIXEL / PRESENCE OF RIGHT PIXEL
※ ALL THE PIXELS OF INTEREST ARE FORMED FROM LEFT-HAND SIDE.
※ LEFT AND/OR RIGHT PIXELS HAVING BEEN LIGHTED ARE FULLY LIGHTED.
FIG.26

SEMICONDUCTOR LASER DRIVE CONTROL DEVICE

BACKGROUND OF THE INVENTION

1. Field of the Invention

The present invention relates to a semiconductor laser drive control device for driving a semiconductor laser based on input image data.

2. Description of the Related Art

As high-speed and high-quality image forming apparatus, a copying machine, a laser beam printer, and the like employing an electrophotography system have conventionally been known. Recently, digital contents have been growing popular both at home and at the office, and accordingly a demand for improving image quality in the image forming apparatus has further been increasing and a recording resolution of the apparatus has also been making progress toward a higher density, such as 1200 dpi, 2400 dpi, or 3600 dpi.

In such image forming apparatus based on the electrophotography system, binary or multivalued data are converted into an amount of irradiating light onto an image carrier. Then, a surface of the image carrier is scanned with, for example, a laser beam having the converted amount of irradiating light. Such processing enables any images including from a binary image such as a character to a halftone image such as a photograph to be formed.

Examples of a method for reproducing the halftone include methods such as a dither method, an error diffusion method, and a density pattern method (a dot pattern method). The use of such method enables each pixel to be output in a multivalued form, whereby an excellent output image can be provided.

As a method for converting the output multivalued data into an amount of irradiating light, a Pulse Width Modulation (PWM) method and a Power Modulation (PM) method have been proposed. Also, a method for controlling an amount of light, which is a combination of the above methods, has been proposed.

The image forming apparatus has recently been requiring a higher density in a recording resolution and higher image quality. Accordingly, challenges have arisen to provide excellent dot reproducibility in a highlight region and to reproduce a high-density dot and a high-density line such as an outline character and an outline line.

In order to fulfill the requirement for the higher density in a recording resolution, an increase in speed of a laser driver device is a must; however, the increase in speed causes the following negative effect. That is, an amount of light is decreased due to a defective rising of a laser emission in a highlight region, whereas an amount of light is increased due to a defective falling of the laser emission in a high-density region, and therefore linearity of the laser emission is reduced, whereby image quality is deteriorated.

Therefore, providing excellent dot reproducibility in a highlight region has been proposed, on which a technique has been known as that described in Japanese Patent No. 2698099, or Japanese Patent Application Laid-open Nos. 9-116750 (1997), 2001-130050, 2002-361922, 2002-361925, 2003-266763, 2006-96008, 2000-177171, 6-155800 (1994), or 2004-122587.

Alternatively, a correction technique using an LUT (look-up table) in an engine capable of a multivalued output within one pixel has also been widely known.

However, it has not been able to correct collapse of the resolution due to a defective falling of a laser optical signal in a high-density region where a signal of the laser optical signal changes from an intermittent mode to a continuous mode.

In the case of carrying out a correction in a specific region comprised of only a highlight region or high-density region, because an appropriate correction over all gradations has not been possible, the gradations have become discontinuous between correction application and non-application regions, and a tone jump has been likely to occur.

Also, in the case of carrying out a correction with a same correction amount over all gradations, an effective correction has not been possible from a highlight region where a turn-on delay of a laser causes a problem to a high-density region where a turn-off delay of the laser causes a problem.

On the other hand, regarding a correction technique using an LUT in the engine capable of a multivalued output within one pixel, a satisfactory correction has not been possible in the case of a smaller number of bits per one pixel, due to a recent increase in resolution. Specifically, under the condition of a resolution of 1200 dpi, 2400 dpi, or the like and an output of 1 to 4 bits, a satisfactory correction has not been possible.

Also, the LUT to be used for the correction is dependent on a pixel condition around a pixel to be corrected, in particular, on pixel distance between a falling of a pixel preceding the pixel to be corrected in a scanning direction and a rising of the pixel to be corrected. For this reason, a simple LUT correction within one pixel has not been useful for a satisfactory correction, whereby a problem has arisen in reproducibility of gradations.

On the other hand, there also exists a problem on a technology for correcting nonlinearity of the electrophotography. Recent electrophotographic image recorder is in so-called digital form, wherein an image pattern is formed by laser blinking and a halftone region is expressed based on a ratio of an area receiving the laser blinking. Also, a conventional analog system has a similar problem in development characteristics. That is, a highlight region has a low image density due to the non-adhesion of toner and a high-density region exhibits S-characteristics due to the saturation of toner concentration. This is generally known as fundamental nonlinearity arising during latent image processing to development processing in the electrophotography.

In order to correct such basic characteristics present in the electrophotography, a correction inverse of the S-characteristics can be carried out such that an amount of light in the highlight region is enhanced and an amount of light in the high-density region is reduced. As such a technique, a technique providing excellent gradation characteristics has been disclosed in Japanese Patent Application Laid-open Nos. 2000-177171 and 6-155800 (1994). However, the disclosed technique is intended to carry out a correction such that an amount of light is enhanced and reduced for one-dot/one-space images and one-line/one-space images respectively. Therefore, an image region where a turn-off delay of a laser occurs has been unable to be an object to be corrected.

SUMMARY OF THE INVENTION

It is therefore an object of the present invention to solve such problems and provide a semiconductor laser drive control device capable of improving gradation characteristics from the highlight region to the high-density region. In order to accomplish the object, the present invention has the following features.

The semiconductor laser drive control device provided by the present invention is intended for driving and controlling a semiconductor laser on a basis of image data, comprises correcting means for increasing an amount of emitting light from the semiconductor laser in a highlight region and decreasing an amount of light from the semiconductor laser in a high-density region and drive controlling means for driving and controlling the semiconductor laser on a basis of a pixel corrected by the correcting means, and is characterized in that the correcting means sequentially varies a correction amount in accordance with a time interval from a time point when a laser emission is stopped to a time point when a laser emission is started while a laser beam emitted from the semiconductor laser is scanned.

The correcting means in the above-described semiconductor laser drive control device is characterized by carrying out different corrections for emission characteristics of the semiconductor laser for the highlight region and the high-density region respectively.

The correcting means in the above-described semiconductor laser drive control device is characterized by sequentially varying a correction amount in accordance with a time interval in reference to a look-up table correlating the time interval from the time point when a laser emission is stopped to a time point when a laser emission is started with a sequentially varying correction amount with respect to the time interval, while a laser beam emitted from the semiconductor laser is scanned.

The above-described correction of a pixel of interest in reference to the look-up table is characterized by carried out by using the look-up table switched in accordance with a presence or an absence of a pixel around the pixel of interest.

The above-described semiconductor laser drive control device is characterized in that a correction for correcting a delay arising from emission characteristics of the semiconductor laser in the highlight region and the high-density region and a correction for basic characteristics of electrophotography in which the laser beam is scanned are simultaneously carried out.

The above-described correcting means is characterized by carrying out a correction for the image data.

The above-described correcting means is characterized by carrying out a correction for a laser driving pulse width signal.

The above-described correcting means is characterized by carrying out a correction for a laser power.

The present invention is mainly intended to correct a turn-on delay at the time of a rising of a PWM signal and a turn-off delay at the time of a falling; however, at the same time, it can also carry out a correction including a correction of nonlinearity inherent in electrophotography. For example, as well as enabling a correction to be carried out such that laser driving becomes appropriate in a highlight region, the present invention enables appropriate gradation characteristics to be obtained by enhancing a light exposure so as to become appropriate in the highlight region where dot reproducibility is difficult.

The present invention as above enables the gradation characteristics from the highlight region to the high-density region to be further improved when image recording is performed at high speed and high density, and a laser drive device also having ideal line width reproducibility to be provided.

Further features of the present invention will become apparent from the following description of exemplary embodiments (with reference to the attached drawings).

BRIEF DESCRIPTION OF THE DRAWINGS

FIGS. 25 (a) to (e) are illustrations for explaining a problem arising when an image output is performed using a LUT for every pixel;

FIGS. 26 (a) to (d) are diagrams illustrating gradation characteristics;

DESCRIPTION OF THE EMBODIMENTS

Embodiments of the present invention will hereinafter be described in detail with reference to the drawings.

Embodiment 1

Figure 1:
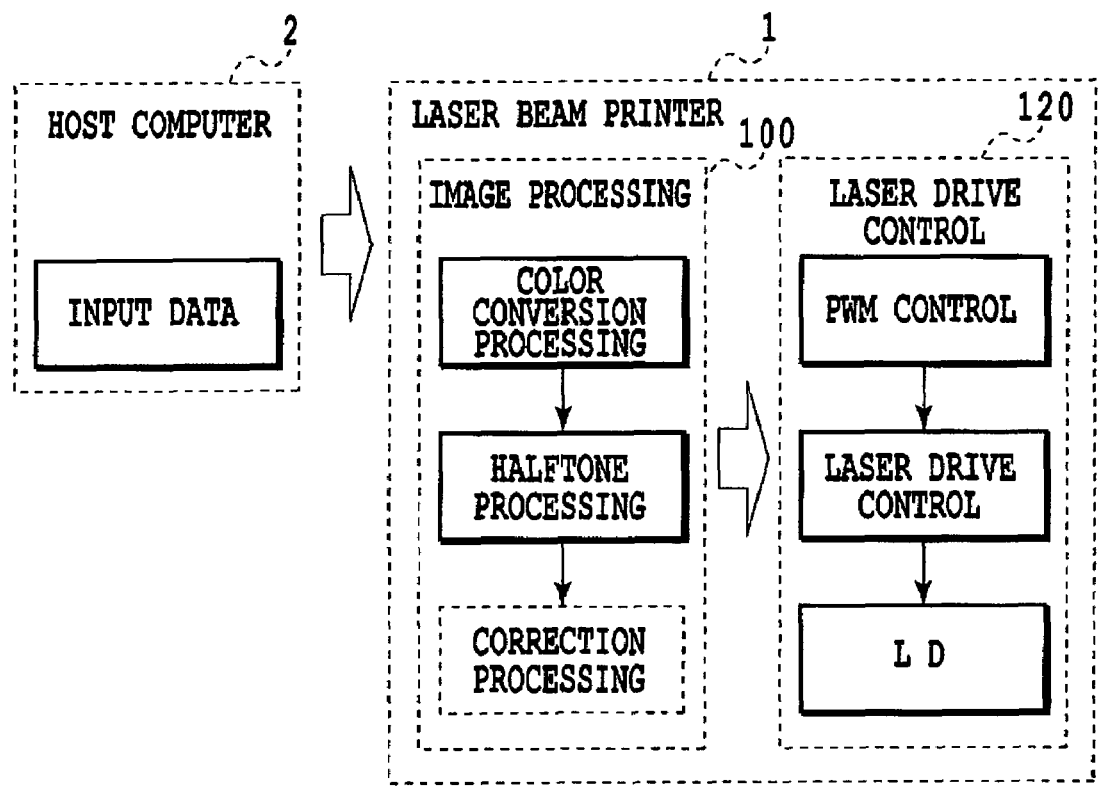
FIG. 1 is a block diagram illustrating a first embodiment of the present invention.

FIG. 1 illustrates a first embodiment of the present invention. This is an example of a laser beam printer which is shown in FIG. 2.

In FIG. 1, the reference numeral 1 represents the laser beam printer, which employs a pulse width modulation (PWM) system as the system for converting multivalued data into an amount of irradiating light and comprises an image processing 100 and a laser drive control 120. The image processing 100 performs color conversion processing and halftone processing based on input data from a host computer 2 connected to the laser beam printer 1, and further performs correction processing. The laser drive control 120 performs a PWM control to drive and control a semiconductor laser based on the image data processed in the image processing 100.

Figure 2:
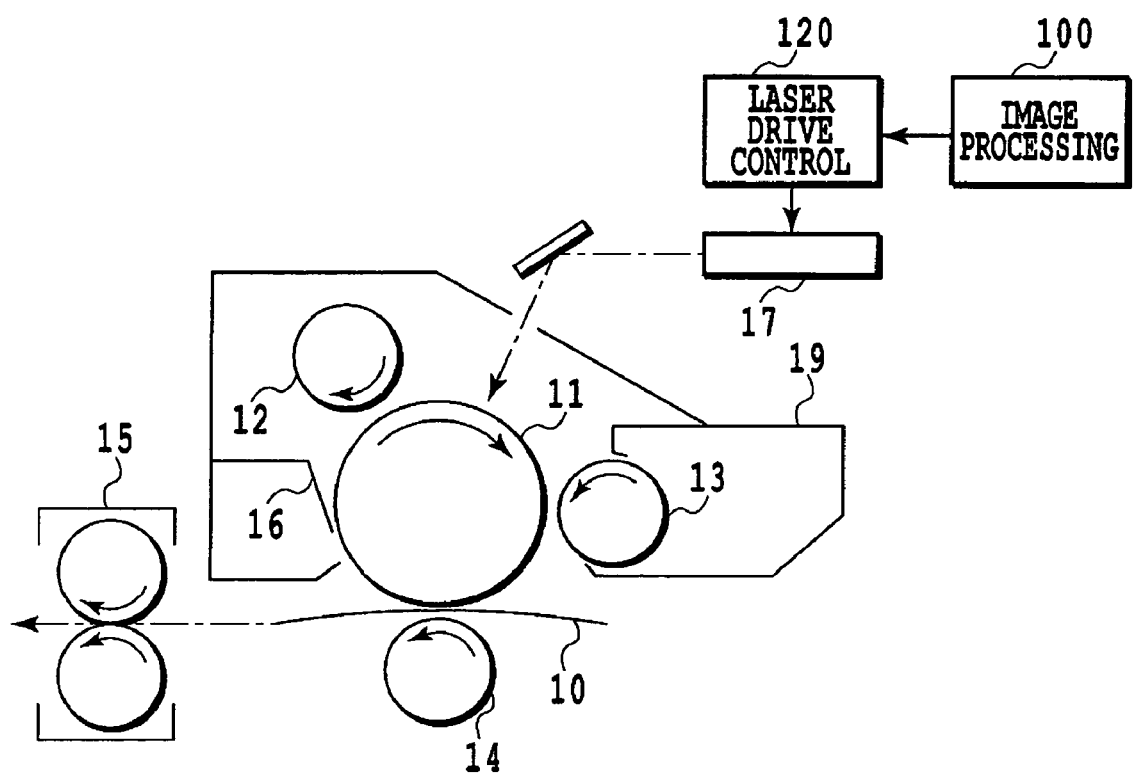
FIG. 2 is a cross-sectional view illustrating a laser beam printer shown in FIG. 1.

Referring now to FIG. 2, an image carrier 11 may be a functional separation type consists of a double layered structure including a charge generation layer and a charge transport layer or a single layer type, using a conductive supporting substrate as the lowest layer. As a charging unit 12, a corona charging system using a corona charger consists of a wire and an electric field control grid may be used. As the charging unit 12, a roller charging system may also be used, wherein charging is performed by applying a DC bias or a DC/AC superposed bias to a charging roller being brought into contact with the image carrier 11. Furthermore, as an image exposure unit, a scanner type employing a semiconductor laser, a combination of an LED and a collector, or another optical system may be used.

As a developing unit 19, a magnetic single-component noncontact developing system wherein magnetic toner is transferred by means of magnetic force and noncontact jumping development is performed on the image carrier with a developing nip, or a magnetic contact developing system wherein development processing is performed by bringing into contact with the image carrier with a developing nip may be used. Also, as the developing unit 19, a nonmagnetic single-component noncontact developing system may be used. This system is intended to regulate nonmagnetic toner with a blade, charge the toner, transfer the toner carried on a developing sleeve, and perform noncontact jumping development of the toner with a developing nip. Furthermore, as the developing unit 19, a nonmagnetic single-component contact developing system may also be used, wherein development processing is performed by bringing into contact with an image carrier with a developing nip. Alternatively, as the developing unit 19, a two-component developing system may be used, wherein development processing is performed by mixing nonmagnetic toner with a magnetic powder carrier and then transferring the mixture to a developing nip with a developing sleeve. As a transfer unit 14, a transfer system using electrical force or mechanical force may be used. As a transferring method using the electrical force, a corona transfer system may be used, wherein transfer is performed by applying a DC bias having a polarity reverse to charging polarity of toner using a corona wire. Also, as the transferring method using the electrical force, a roller transfer system may be used, wherein a roller is made to abut and a bias having a polarity reverse to that of toner is applied.

As a fixing unit 15, a system for passing recording paper through an abutting part of two opposed rollers and fixing toner on the recording material with the aid of heat or pressure, or a system for thermally fixing toner onto the recording material with the use of a noncontact heater or a lamp may be used. Alternatively, the use of a belt type substance as a unit for sandwiching the recording material to fix by applying heat or pressure is also possible.

The operation is now described. The charging unit 12 charges the image carrier 11, which is then exposed by a laser beam, whereby an electrostatic latent image is formed on the image carrier 11. A toner layer on a toner carrier 13 in the developing unit 19 is brought into contact with a surface of the image carrier 11, and then the electrostatic latent image on the image carrier 11 is developed based on a reversal developing method, whereby a toner image is formed on the image carrier 11. The toner image on the image carrier 11 is then transferred by the transfer unit 14 onto the recording paper fed at a predetermined timing. Subsequently, the toner image having been transferred onto the recording paper is heated and pressurized by the fixing unit 15 comprising a heating roller and a pressurizing roller, to thereby be fixed.

Residual toner after transfer on the image carrier 11 after the transfer step is scraped away with a blade-shaped cleaning member 16 made to abut with the surface of the image carrier 11 and then collected by a cleaner. Afterward, the above-described steps are repeated for every image formation.

Figure 3:
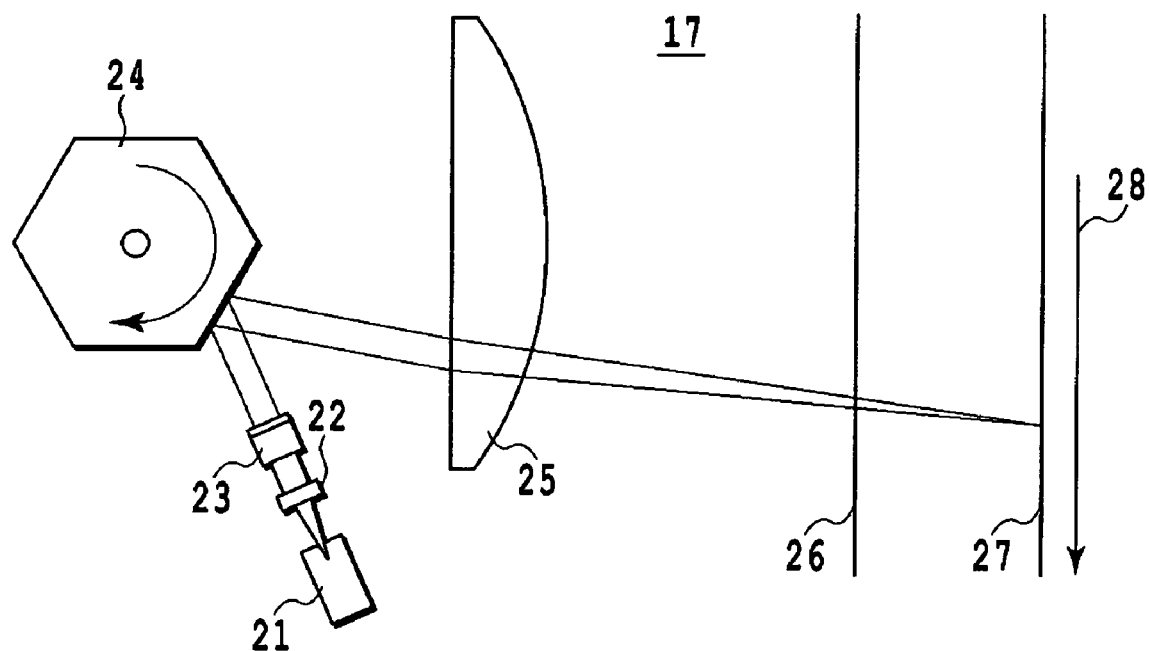
FIG. 3 is a diagram illustrating respective elements of a scanning optical system shown in FIG. 2.

FIG. 3 is a diagram illustrating respective elements of a scanning optical system 17 shown in FIG. 2. The scanning optical system 17 comprises a semiconductor laser 21, a collimator lens 22, a cylindrical lens 23, a rapidly rotating polygon mirror 24, and an f-theta lens 25. The semiconductor laser 21 blinks a laser beam on the basis of a laser drive signal from the laser drive control 120, corresponding to image data from the image processing 100. The laser beam flux emitted from the semiconductor laser 21 is transformed into an approximately parallel beam via the collimator lens 22, which is then directed to the polygon mirror 24 by the cylindrical lens 23. The laser beam is then reflected and deflected by the polygon mirror 24 being rotating at a constant velocity. Subsequently, the laser beam passing through the f-theta lens 25 is again deflected at a return mirror position 26, focused on an image plane 27 of the image carrier 11 in a spot shape, and scanned at a constant speed in a scanning direction 28.

Figure 4:
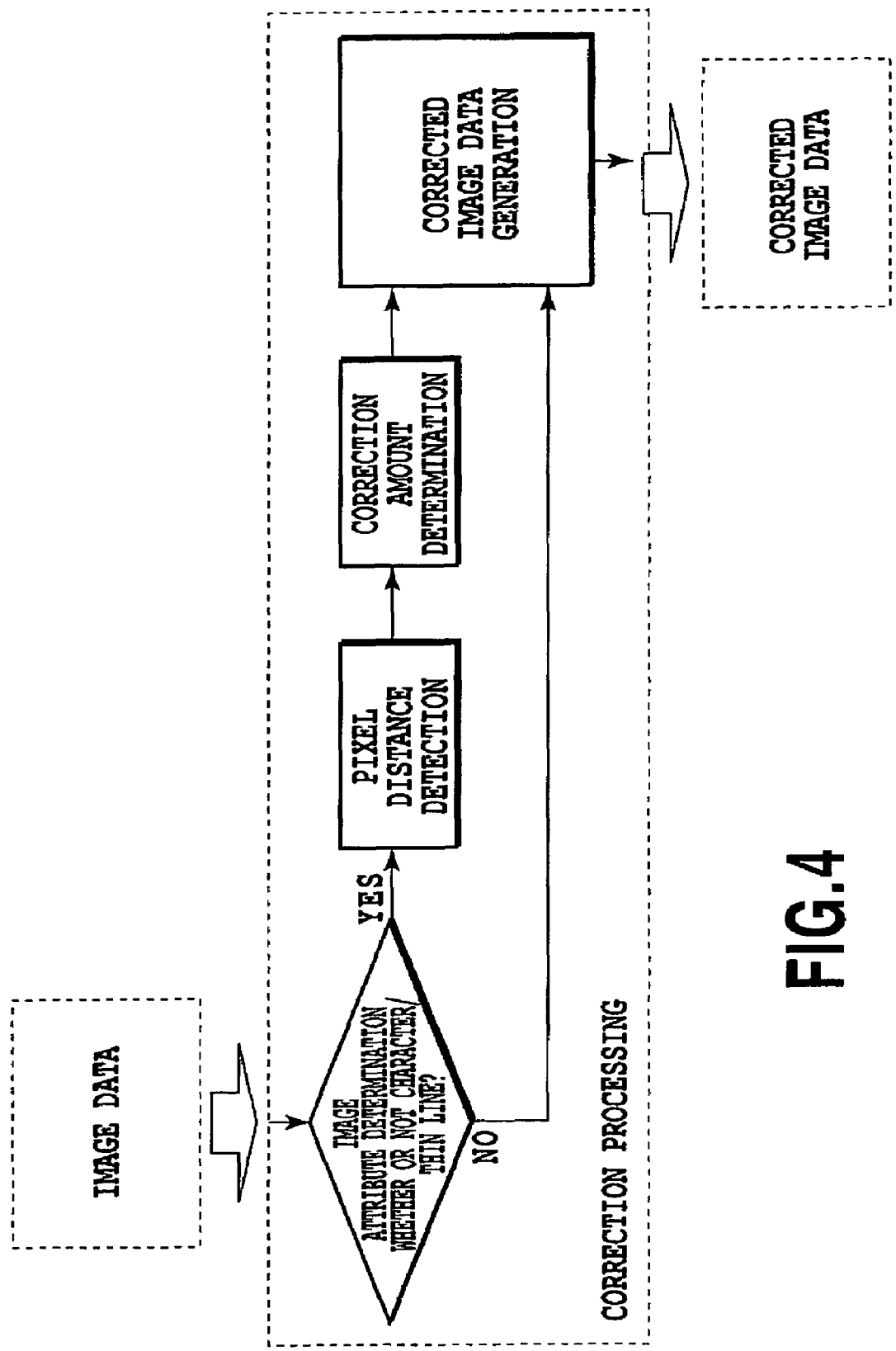
FIG. 4 is a diagram illustrating a procedure for correction processing performed in a correction processing shown in FIG. 1.

FIG. 4 illustrates a procedure for correction processing of the image processing 100. According to the procedure, a pixel distance and a time interval between a rising and a falling are detected from image data and a PWM signal before correction, and then the image data and the PWM signal are corrected on the basis of a correction amount corresponding to the obtained detection amount.

To describe FIG. 4 in more detail, the correction processing receives the image data, which are discriminated in an image attribute discrimination on the basis of attribute information on a pixel of interest whether on a character/thin line or on the other. If it is discriminated that the image data are related to a character/thin line, a pattern matching is performed on data stored in a line buffer. Then, the pixel distance is obtained, and correspondingly to the pixel distance, the correction amount is determined on the basis of an LUT set in a correction amount determination.

As a method for obtaining the pixel distance, the pixel distance may also be obtained by conditional branch, in addition to the pattern matching. To describe the method in more detail based on the conditional branch, when a pixel of interest i is a rising pixel (the pixel of interest is a black pixel and a pixel immediately before the pixel of interest is a white pixel), the (i-k)th pixel is examined under the condition of k=0 to n. Then, a k value at the time when a black pixel appears can be set as the pixel distance. The value of n can be limited within a pixel distance range covered by the LUT at the time of correction. Also, a desired value may be calculated by preliminarily detecting a falling pixel and counting the number of pixels until a rising pixel appears after the falling pixel. The corrected image data are generated on the basis of the correction amount determined as described and output to the next step.

An example of a binary image has been described; however, a similar concept can be applied to a multivalued image.

As shown in FIG. 4, during the procedure, correction processing is performed at the image data stage. This is more preferable because it enables the ON/OF of the processing to be switched, a correction amount to be optimized, or the like, on the basis of attribute information of an image, i.e., image characteristics such as a character/thin line, or a natural image.

As a method for halftone processing of input image, various methods can be used. Examples of the most popular image processing methods include the dither method and the density pattern method (the dot pattern method). The dither method determines ON or OFF for one pixel on the basis of (m×m) threshold data, when the one pixel included in an input signal having been read is output correspondingly to one pixel for binary recording.

A pulse width of a laser optical signal at the time is controlled on the basis of a gradation; however, an irradiated position can be configured in consideration of a pixel position within a matrix pattern, such as "center", "left", or "right" in the pixel, or an effect of peripheral pixels.

In addition, the use of the error diffusion method or an image forming method using a blue noise mask may also be preferable for outputting a high-definition image realized in this embodiment.

Any engine resolution is applicable, such as an engine resolution of 400 dpi, 600 dpi, 1200 dpi, 2400 dpi, or 3600 dpi. However, in the case of a higher resolution such as 1200 dpi, 2400 dpi, or 3600 dpi, a correction within one pixel is not easy as described above. Because such higher resolution requires a higher image clock and therefore increasingly requires the correction, it is preferable to apply this embodiment to an engine with such higher resolution.

Figure 5:
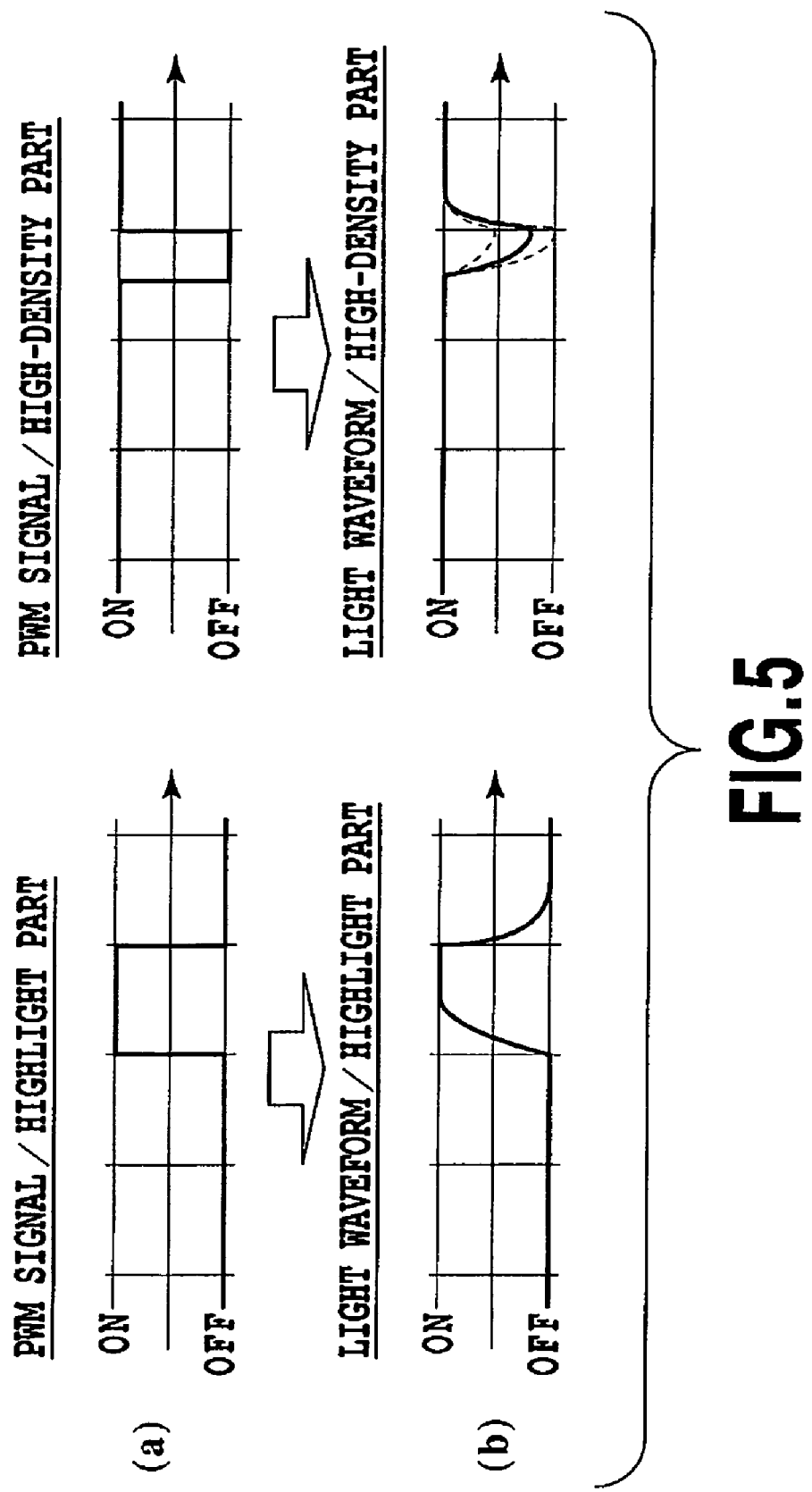
FIGS. 5 (a) to (b) are illustrations for explaining characteristics of a semiconductor laser shown in FIG. 2.

FIG. 5 shows laser emission characteristics corresponding to a laser driving pulse signal input to the semiconductor laser 21 shown in FIG. 3. As shown in FIG. 5, a laser emission width (pulse width) at an ON level in a highlight part becomes narrower, whereas in a high-density part, a laser emission width at an ON level becomes broader, i.e., the linearity of the laser emission is reduced.

In other words, if the pulse width of the laser driving pulse signal (PWM signal, see FIG. 5 (a)) at the ON level is not corrected, the following problem arises. A laser optical signal emitted from the laser-emitting element on the basis of the laser driving pulse signal has an actual emission width narrower than a desired laser emission width in the highlight part due to characteristics of the laser-emitting element, whereas in the high-density part, the actual width is broader than a desired width. For this reason, the linearity of the laser emission is reduced.

In FIG. 5, arrows represent a scanning direction of the laser beam. For simplicity, the reduction in linearity of laser driving is treated as the laser emission characteristics in this embodiment. However, as heretofore known, a reduction in linearity arising at the time of generating a pulse width signal from a data signal is also to be corrected.

Figure 6:
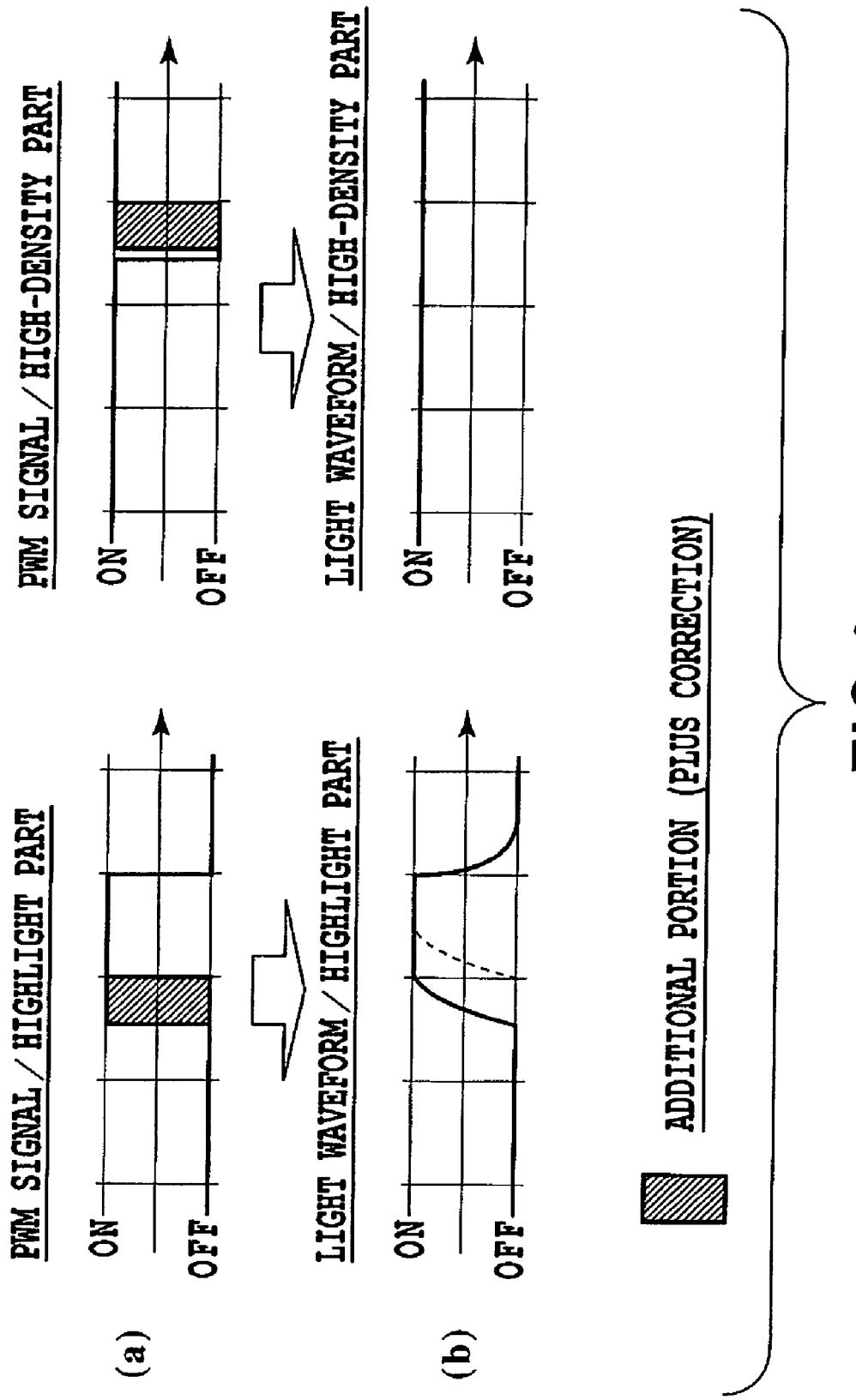
FIGS. 6 (a) to (b) are illustrations for explaining one example of a pulse width correction.

For this reason, correcting a pulse width with respect to a rising position of the laser emission enables the pulse width broader than a pulse width based on input data to be set and consequently a desired laser emission width to be obtained as shown in FIG. 6. As correcting means for this purpose, heretofore known correcting means can be used, such as an addition of binary data or multivalued data in an image data generating, or a direct modification of a pulse width.

Figure 7:
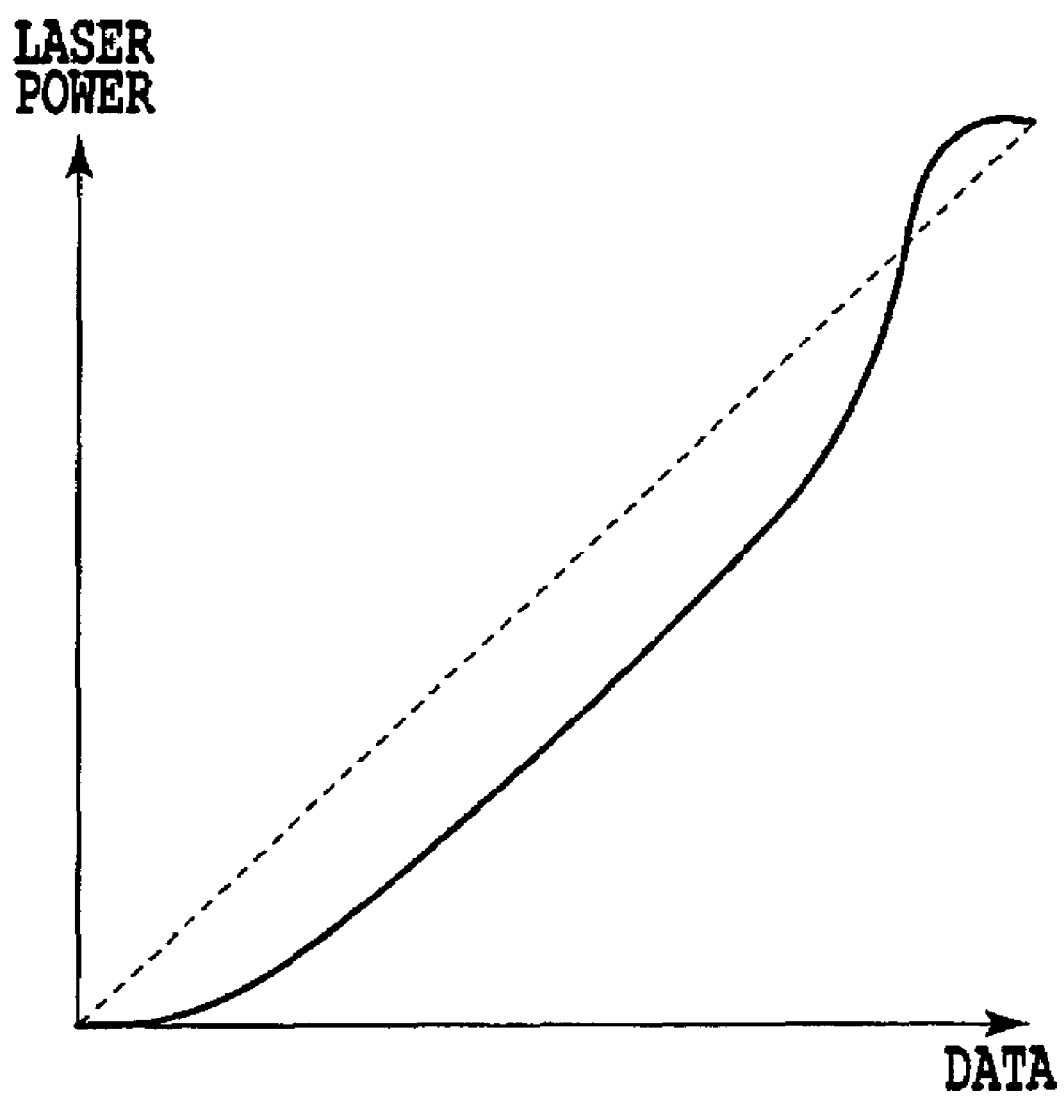
FIG. 7 is a diagram illustrating Laser Power characteristics to Data before a correction.
Figure 8:
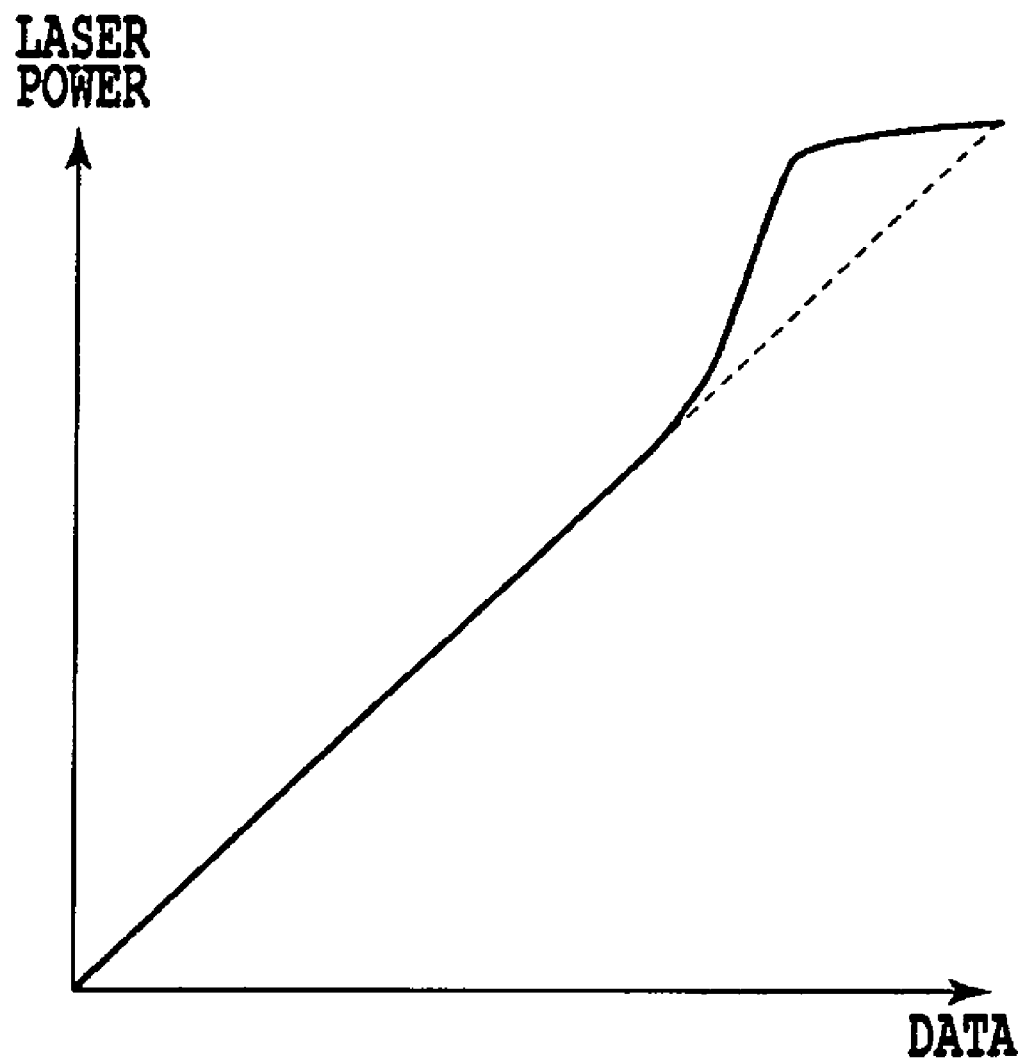
FIG. 8 is a diagram illustrating Laser Power characteristics to Data after a correction.

In this example, because a correction is carried out with respect to all the rising positions of the laser emission, the linearity in the highlight part is improved as shown in FIG. 8, in comparison with Laser Power characteristics to Data before the correction (see FIG. 7). However, the linearity in the high-density part is more deteriorated than that before the correction. The horizontal axis Data in the diagram represents an input data value at the time when pulse width driving is performed at some engine resolution, and the vertical axis Laser Power represents an accumulated amount of light emitted from the laser.

Figure 9:
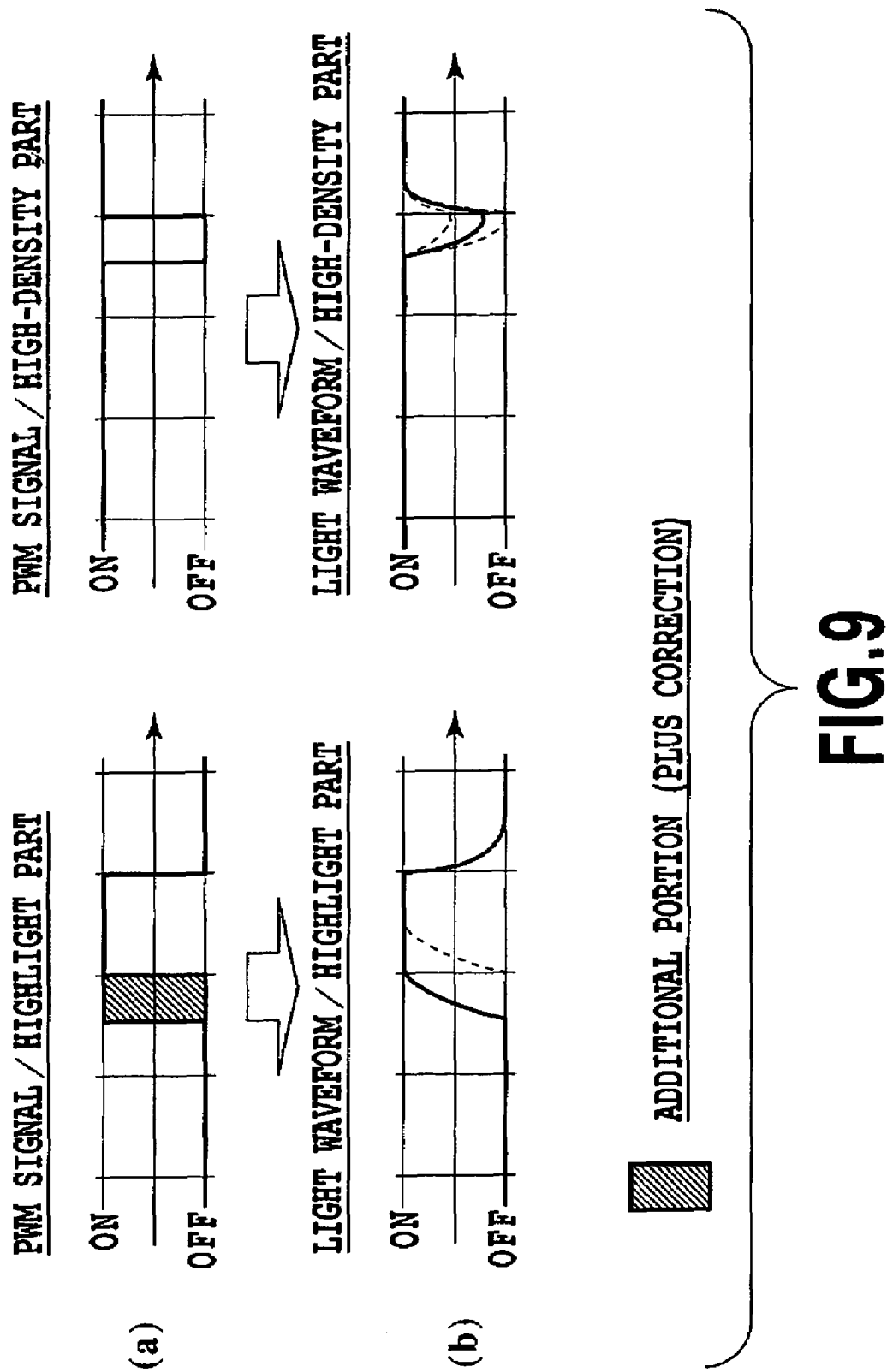
FIGS. 9 (a) to (b) are illustrations for explaining a pulse width correction carried out only for an isolated dot in a highlight region.
Figure 10:
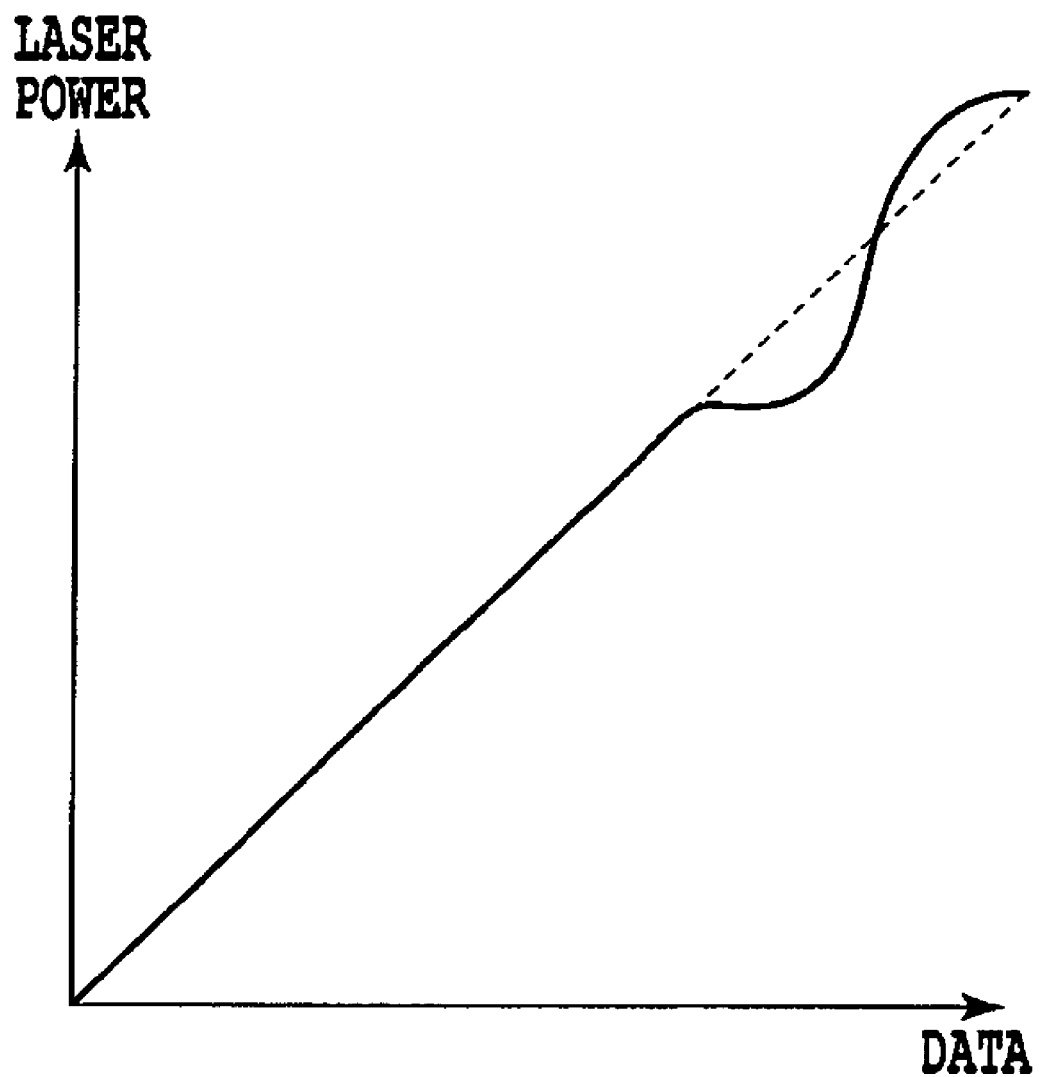
FIG. 10 is a diagram illustrating Laser Power characteristics to Data after a correction.

In order to prevent such a reduction in linearity in the high-density part, it may be considered that, for example, a pulse width in the high-density part is not corrected whereas only a pulse width for an isolated dot in the highlight part is corrected. An example of this is shown in FIG. 9. However, if such a correction is carried out, the linearity in the high-density part is not reduced, but as shown in FIG. 10, the difference in gradation level occurs at a switching part between a gradation region to be corrected and a gradation region not to be corrected.

Therefore, in this embodiment, in the highlight region where the laser emission width is decreased, a correction only for more broadening the pulse width (hereinafter referred to as a "plus correction") is carried out. On the other hand, this embodiment is adapted to carry out a correction for narrowing the pulse width (hereinafter referred to as a "minus correction") in the high-density region where the laser emission width is increased. This results in the improvement of the linearity of the laser emission.

Figure 11:
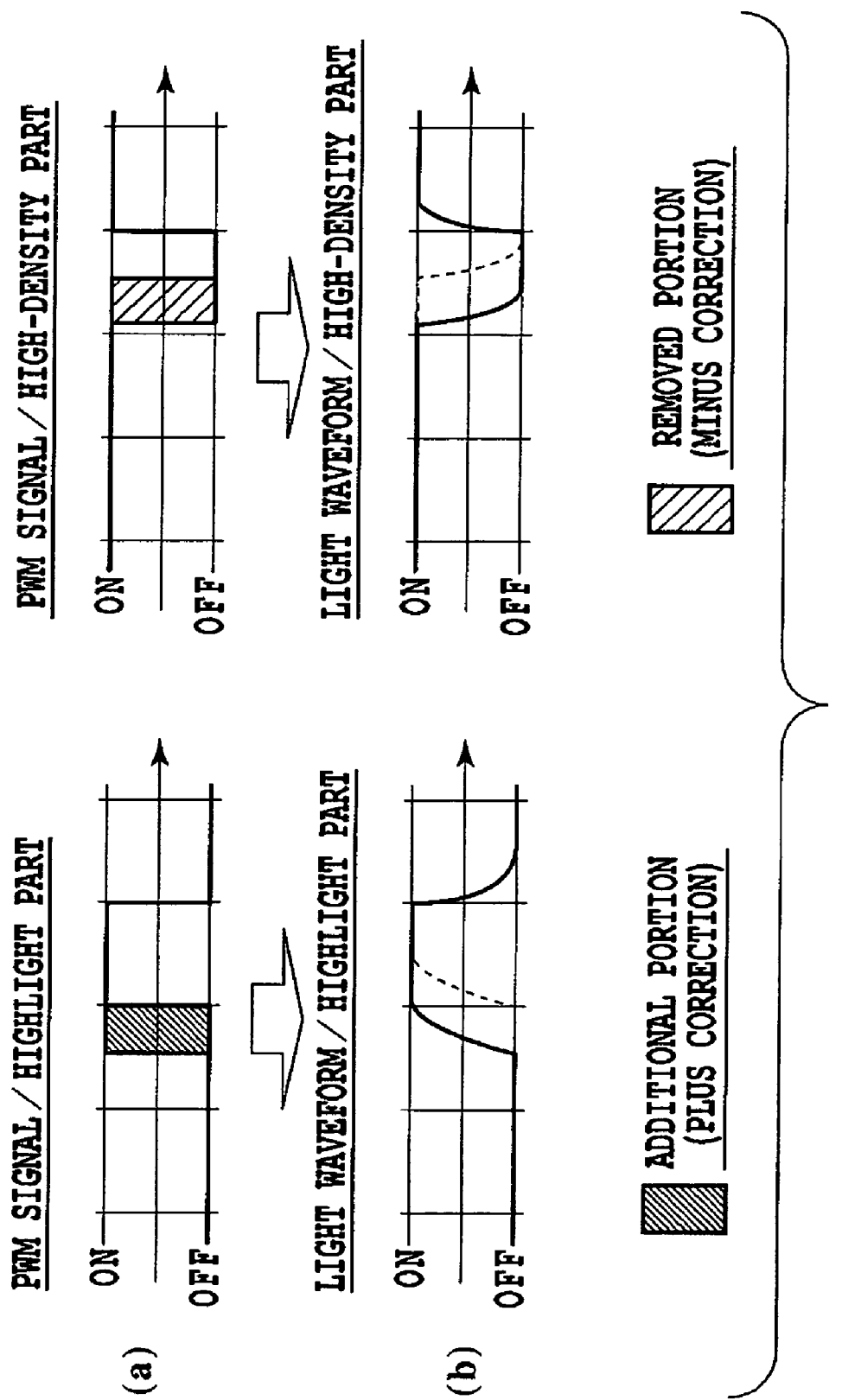
FIGS. 11 (a) to (b) are illustrations for explaining one example of a pulse width correction according to a first embodiment.
Figure 12:
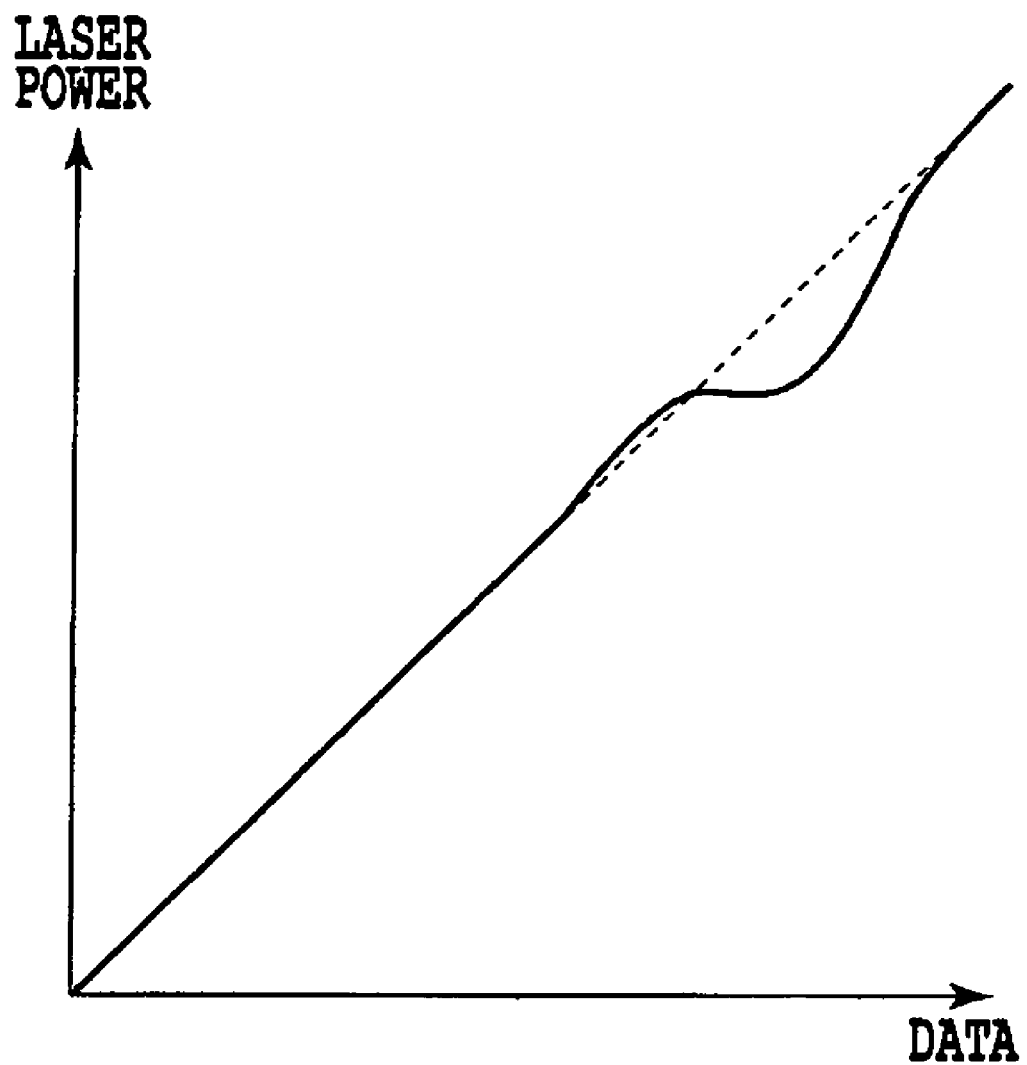
FIG. 12 is a diagram illustrating Laser Power characteristics to Data after a correction.
Figure 13:
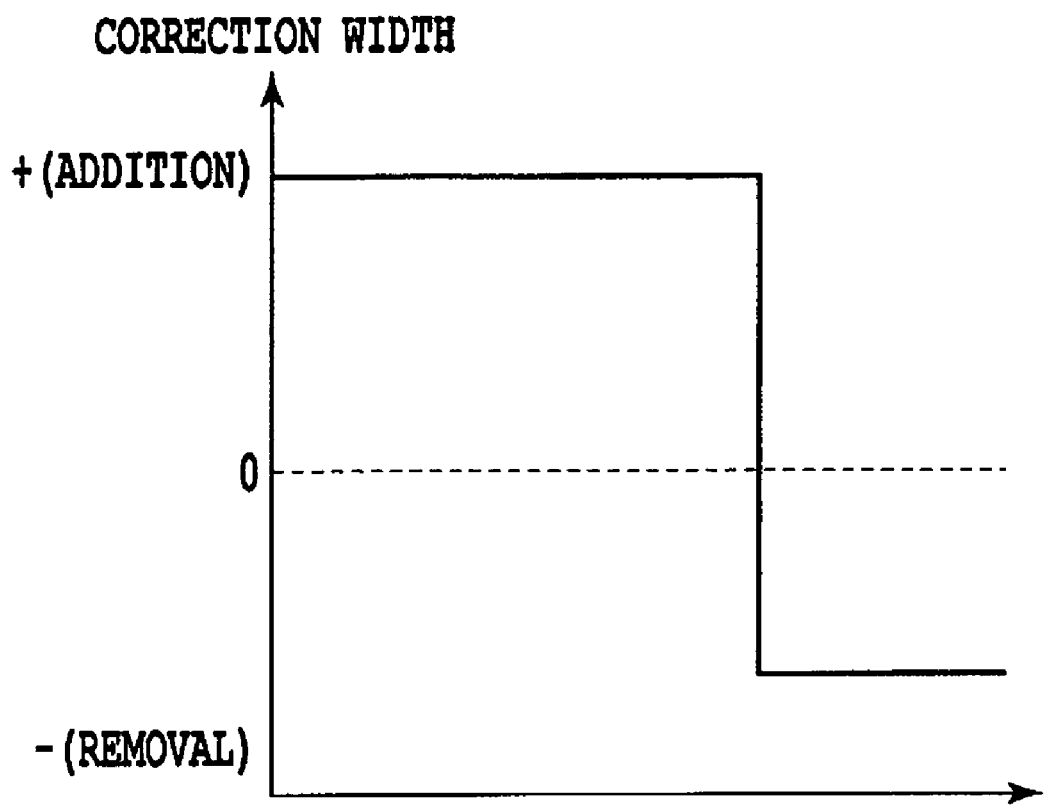
FIG. 13 is a diagram illustrating one example of correction width to pixel distance.

Specifically, carrying out the minus correction for decreasing the pulse width in the high-density part as shown in FIG. 11 enables the linearity in the high-density part to be improved as shown in FIG. 12. One example of a method for switching a correction pulse width is shown in FIG. 13. The horizontal axis in the diagram represents an interval between a rising and a falling of a laser pulse obtained from pixel information or laser pulse information, and the interval becomes shorter toward the right of the axis.

Also, in this embodiment, the plus correction is carried out in the highlight region where the laser emission width is decreased. A correction width of the plus correction is sequentially varied in accordance with a time interval from a time point when a laser emission is stopped to a time point when a laser emission is started. This results in the elimination of discontinuity in gradation characteristics as well as the improvement of the linearity of the laser emission, which is one of features of this embodiment.

Figure 14:
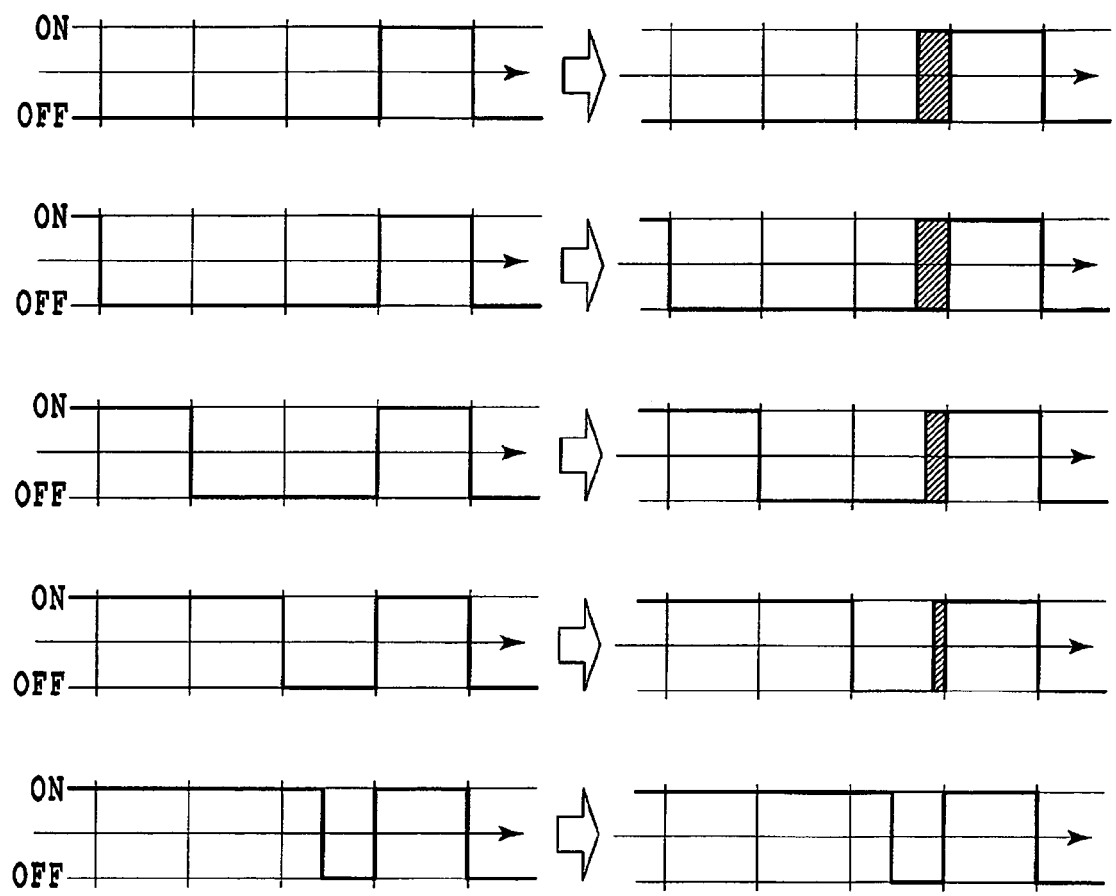
FIG. 14 is an illustration for explaining an example of switching a correction amount stepwise from a highlight region to a high-density region.
Figure 15:
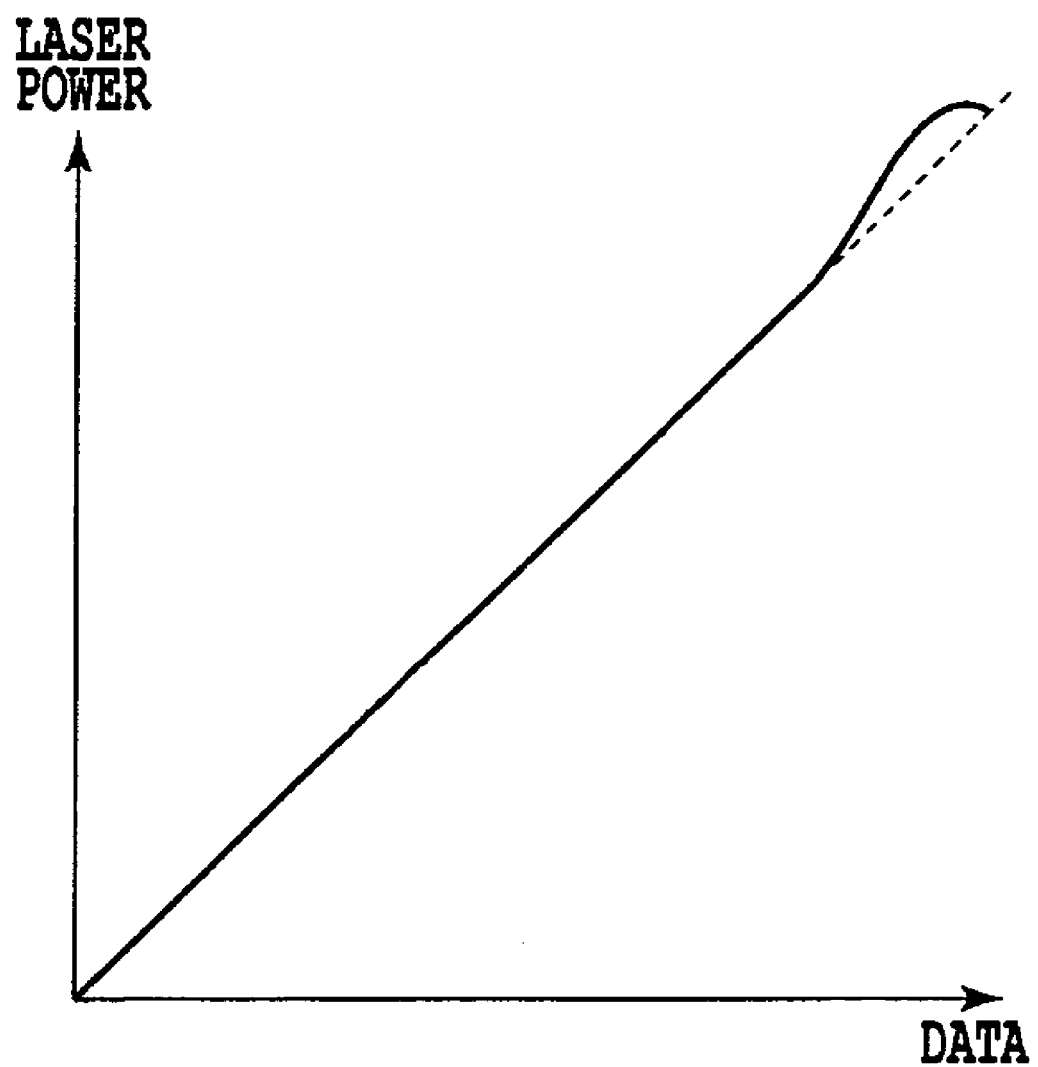
FIG. 15 is a diagram illustrating Laser Power characteristics to Data after a correction.
Figure 16:
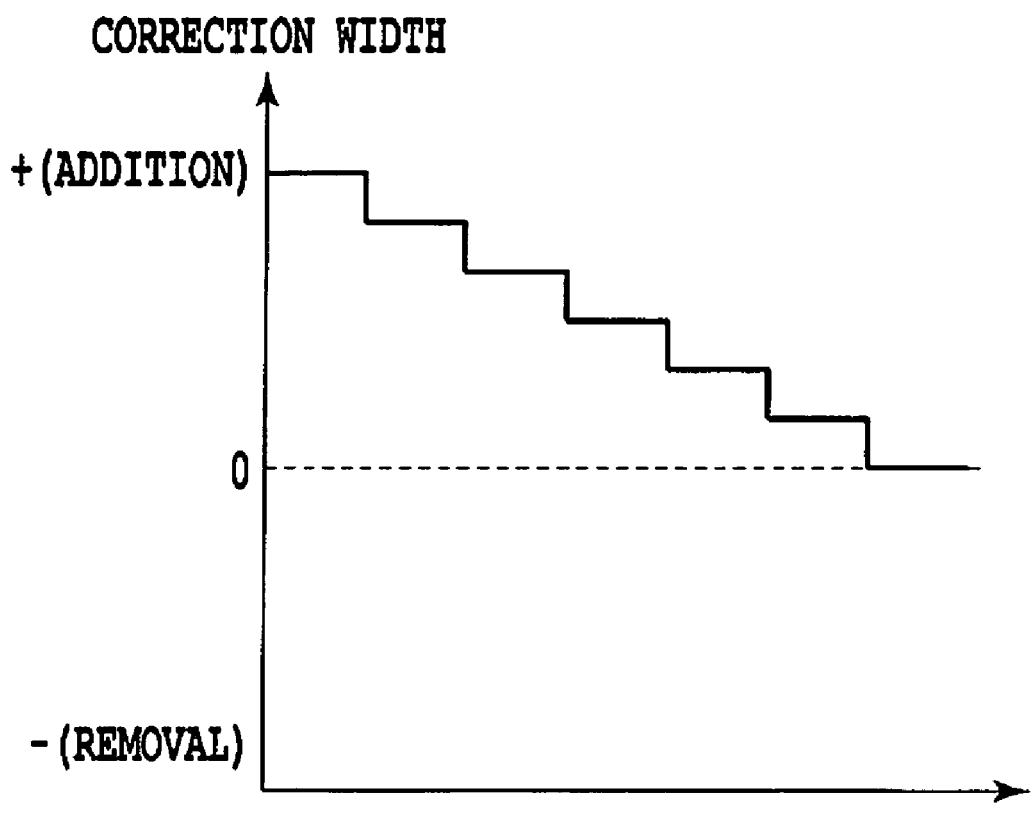
FIG. 16 is an illustration for explaining an example of switching a correction amount stepwise from a highlight region to a high-density region.

Specifically, as shown in FIG. 14, a correction amount is switched stepwise from the highlight region to the high-density region. This enables a laser to be driven with high linearity from the highlight region to the high-density region as shown in FIG. 15. One example of a method for switching a pulse width is shown in FIG. 16. The horizontal axis in FIG. 16 represents an interval between a rising and a falling of a laser pulse obtained from pixel information or laser pulse information, and the interval becomes shorter toward the right of the axis.

Also, in this embodiment, the plus correction is carried out in the highlight region where the laser emission width is decreased, and a correction width of the plus correction is sequentially varied in accordance with a time interval from a time point when a laser emission is stopped to a time point when a laser emission is started.

Also, in the high-density region where the laser emission is increased, the minus correction is similarly carried out so that the correction width is sequentially varied in accordance with a time interval from a time point when a laser emission is stopped to a time point when a laser emission is started This enables the linearity of the laser emission to be significantly improved and the discontinuity in gradation characteristics to be eliminated.

Figure 17:
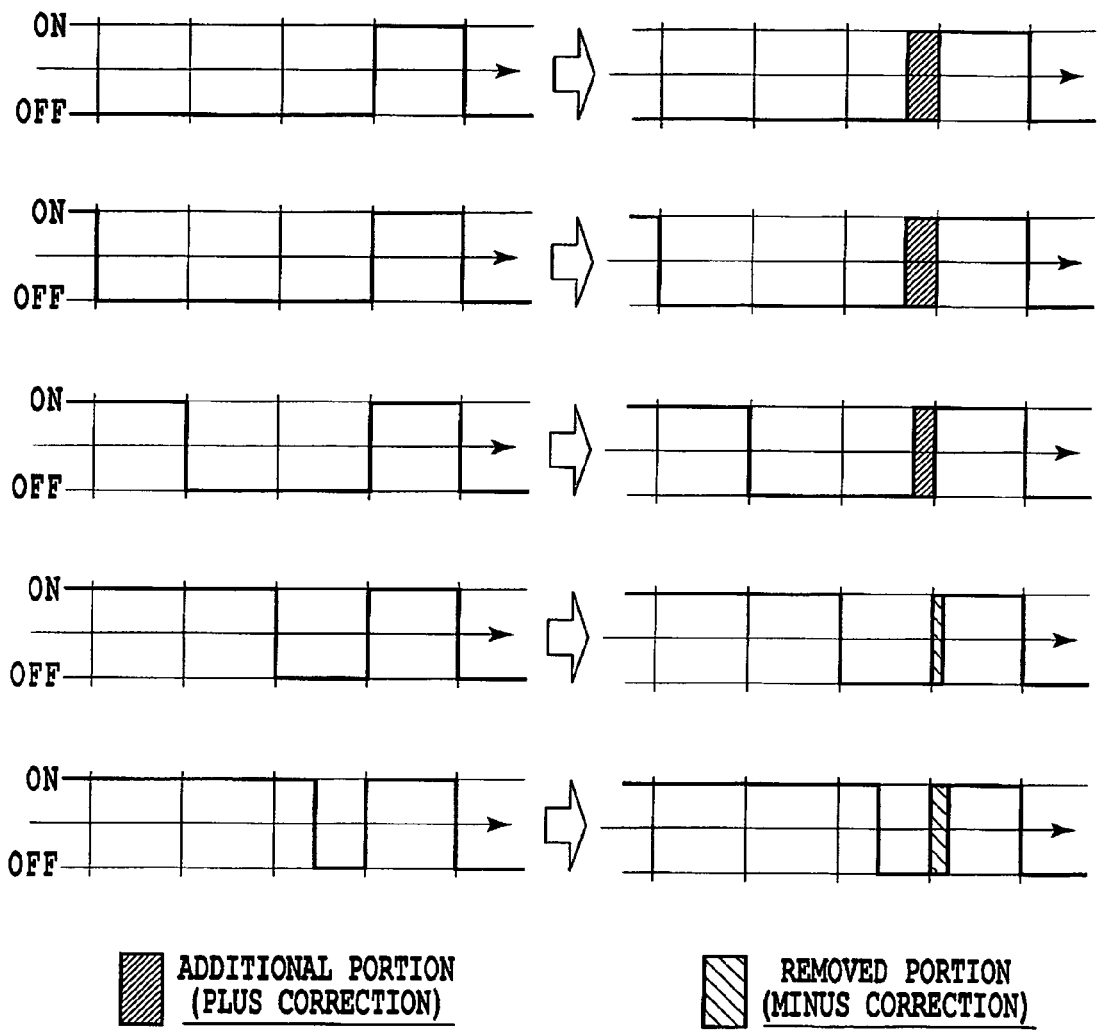
FIG. 17 is an illustration for explaining a plus correction and a minus correction.
Figure 18:
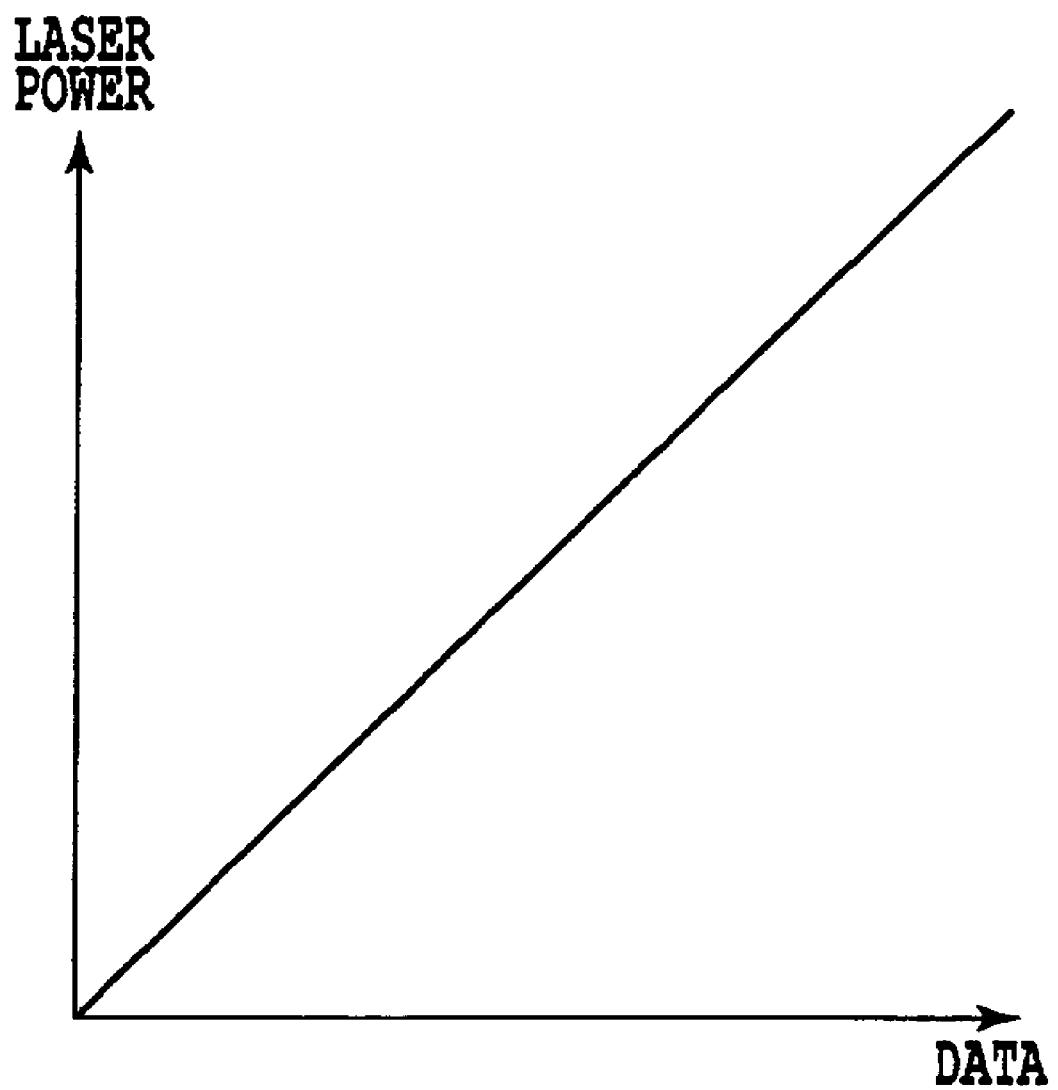
FIG. 18 is a diagram illustrating Laser Power characteristics to Data after a correction.
Figure 19:
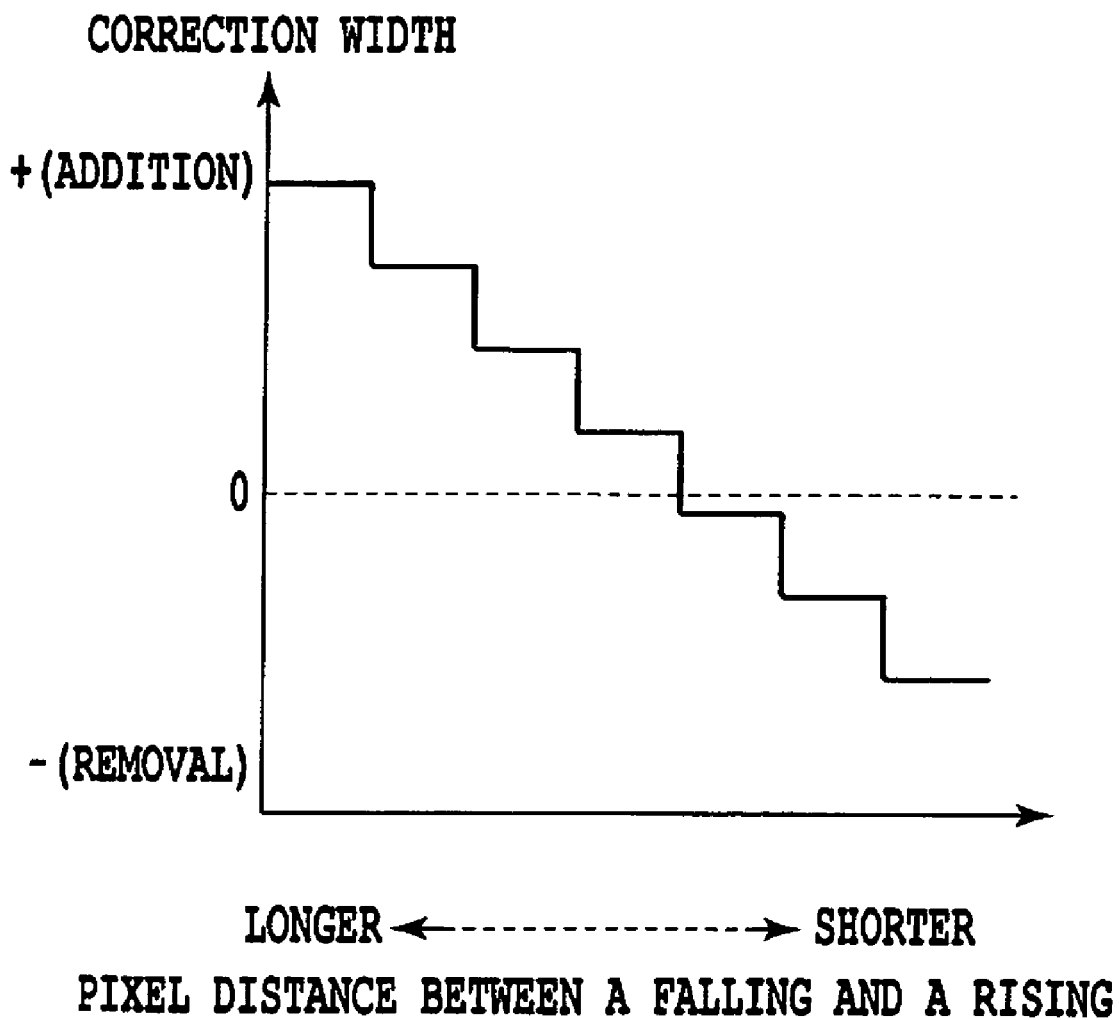
FIG. 19 is an illustration for explaining an example of switching a correction amount stepwise from a highlight region to a high-density region.

Specifically, switching a correction amount stepwise from the highlight region to the high-density region as shown in FIG. 17 enables a laser to be driven with high linearity from the highlight region to the high-density region as shown in FIG. 18. One example of a method for switching a pulse width is shown in FIG. 19. The horizontal axis Data in the diagram represents an input data value at the time when pulse width driving is performed at some engine resolution, and the vertical axis Laser Power represents an accumulated amount of light emitted from the laser.

As means for switching the correction amount, determining the correction amount stepwise by numerical calculation or by the use of a look-up table in accordance with a blank time period relative to a position where a laser emission of interest rises, from a position where a previous laser emission is stopped can be used.

As a method for monitoring the blank time period, various methods including a method for detecting the position where the previous laser emission is stopped, relative to the position where the laser emission of interest rises, on the basis of a rising and a falling of a pulse electrical signal, a detecting method in reference to a data value of a pixel before a pixel of interest by a few pixels at the time point of image data, and a detecting method by pattern matching at the time point of image data are applicable.

In addition, according to this embodiment, even when a sufficient response of a laser emission to an input image data is achieved, further reproducibility of a final toner image in the highlight region can be provided, or further reproducibility of the final toner image in the high-density region can also be provided.

Figure 23:
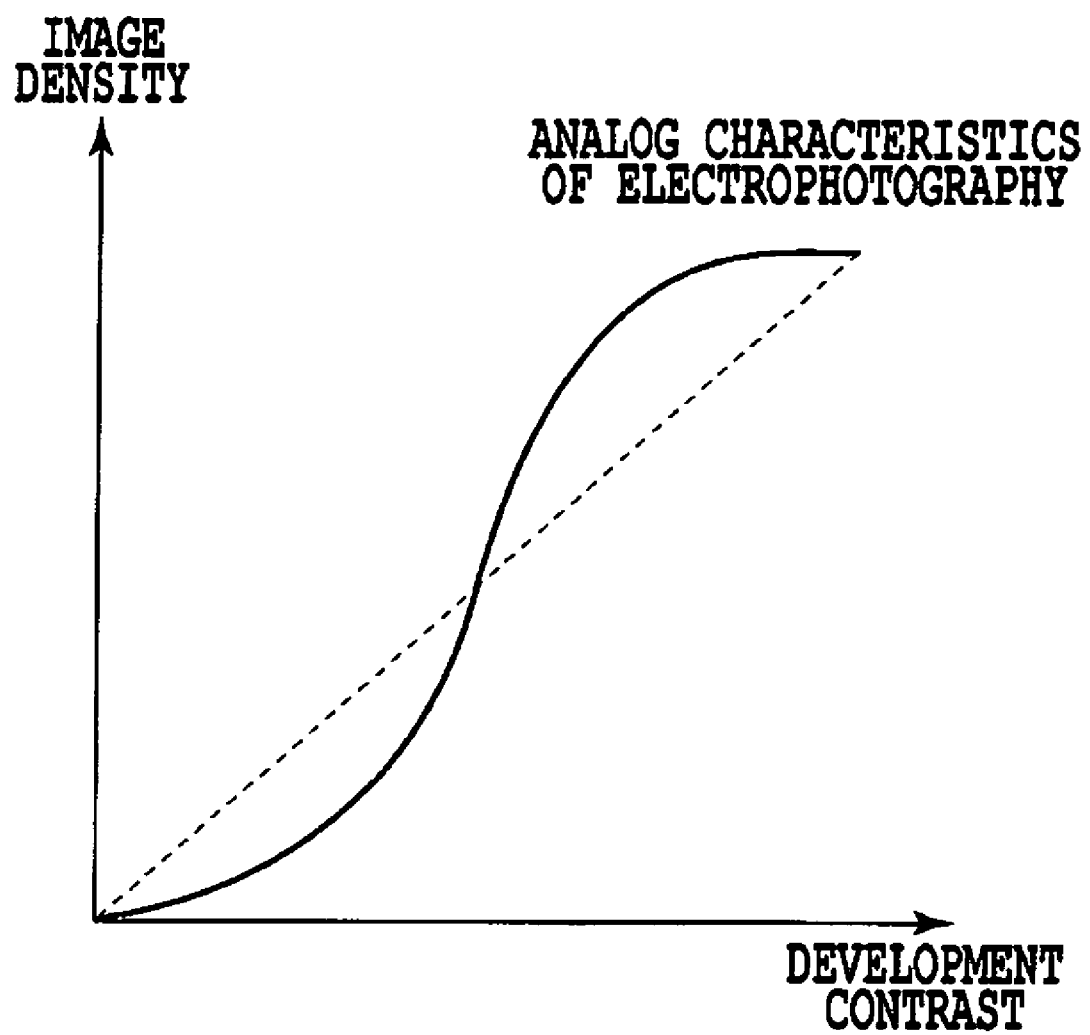
FIG. 23 is a diagram illustrating development characteristics in an analog system.

Meanwhile, recent electrophotographic image recorder is in so-called digital form, wherein an image pattern is formed by laser blinking and a halftone region is expressed based on a ratio of an area receiving the laser blinking. However, there arises a similar problem to that in development characteristics (see FIG. 23) in a conventional analog system. The horizontal axis shown in FIG. 23 denotes a development contrast representing a potential difference from a DC component of a developing bias to a latent image potential. As is clear from FIG. 23, a highlight region has a low image density due to the non-adhesion of toner and a high-density region exhibits S-characteristics due to the saturation of toner concentration. This is generally known as fundamental nonlinearity arising during latent image processing to development processing of electrophotography.

In this embodiment, in order to correct such basic characteristics present in the electrophotography, a correction inverse of the S-characteristics is carried out such that an amount of light in the highlight region is enhanced and an amount of light in the high-density region is reduced. This enables excellent gradation characteristics to be provided from the highlight region to the high-density region. Therefore, as well as eliminating the nonlinearity arising from the basic characteristics of the electrophotography, this embodiment can lead to appropriate gradation characteristics even in an image region where a turn-off delay of a laser occurs.

Embodiment 2

The second embodiment of the present invention is now described.

Figure 20:
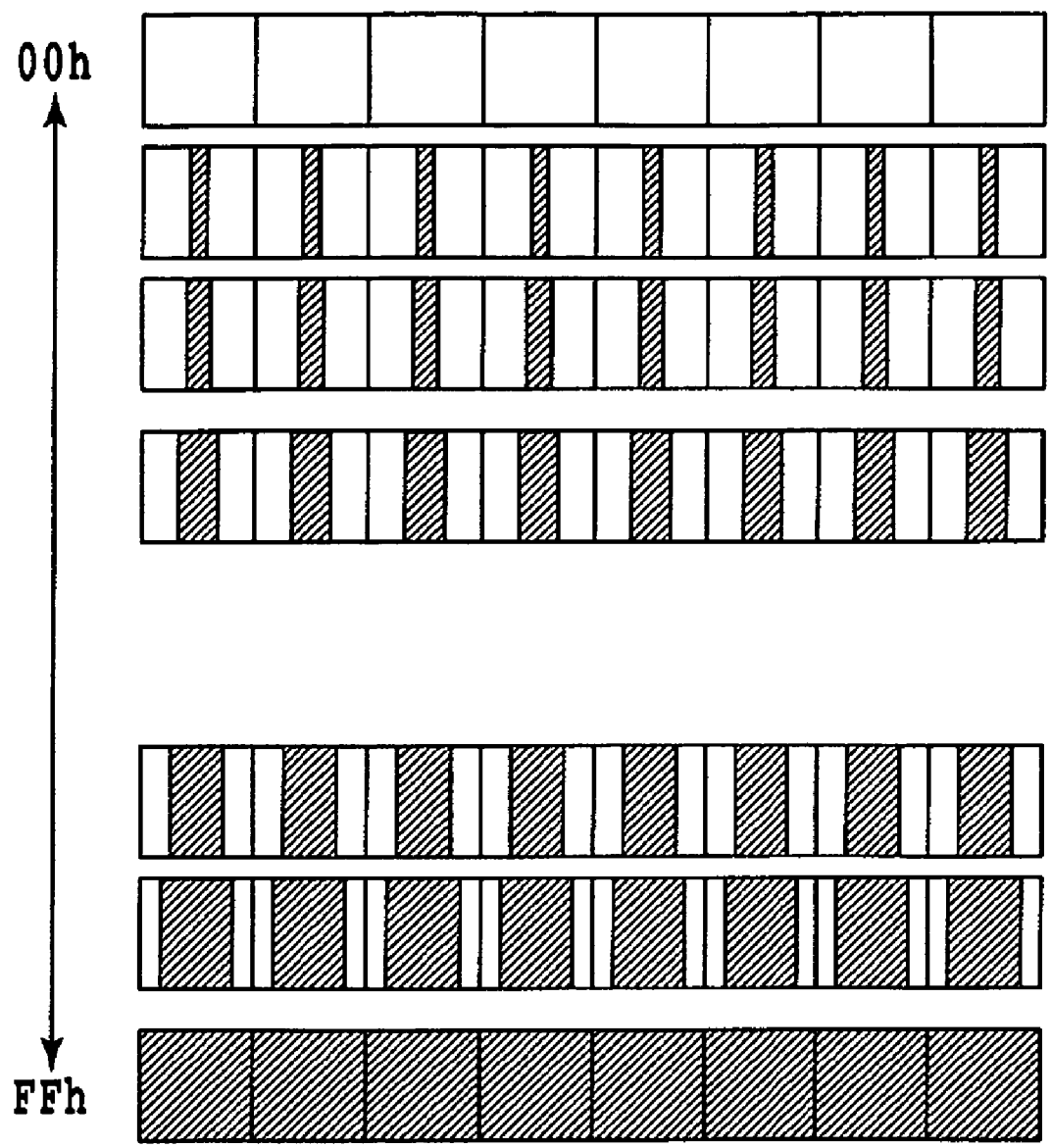
FIG. 20 is a diagram illustrating an amount of emitting light for each of input data of 00h to FFh when each pixel is PWM-driven with the same signal value.
Figure 21:
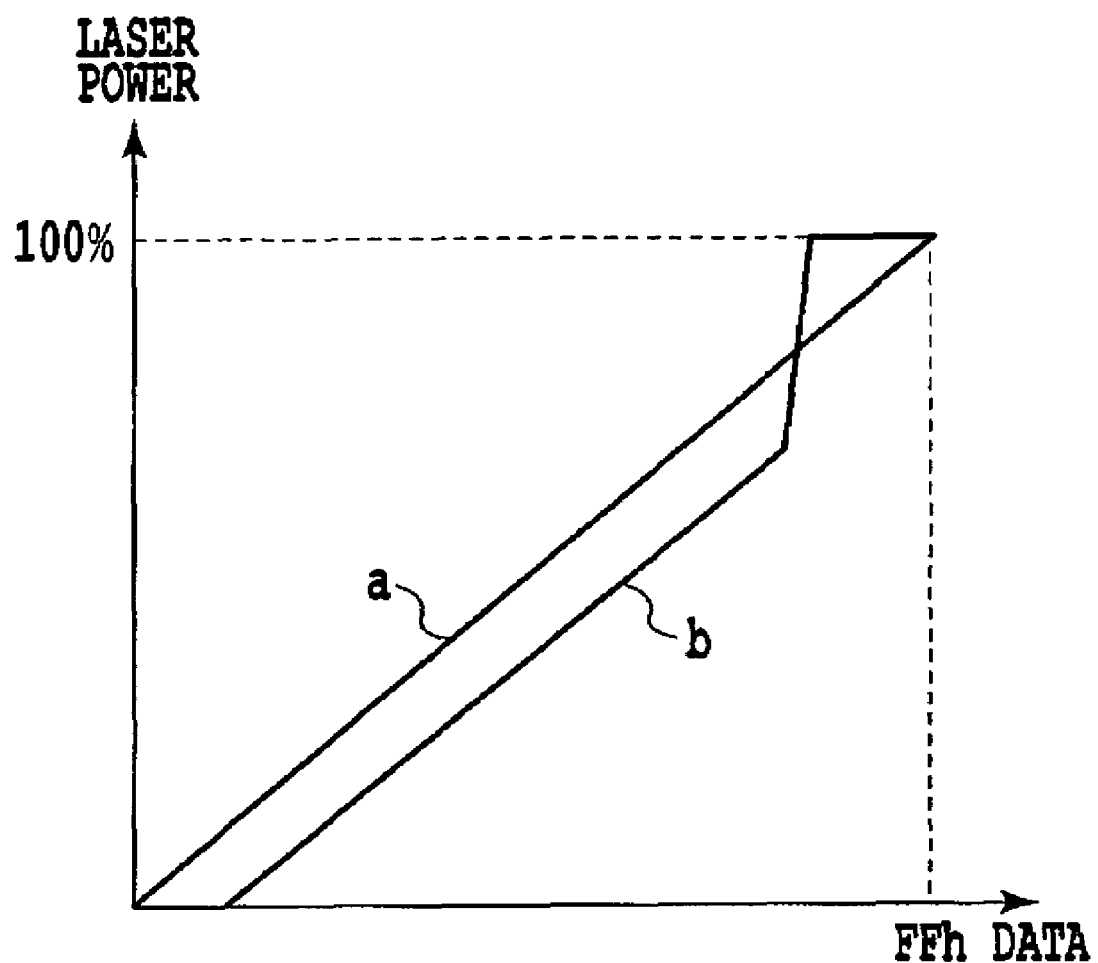
FIG. 21 is a diagram illustrating a result of plotting the amount of emitting light shown in FIG. 18 to the input data.
Figure 22:
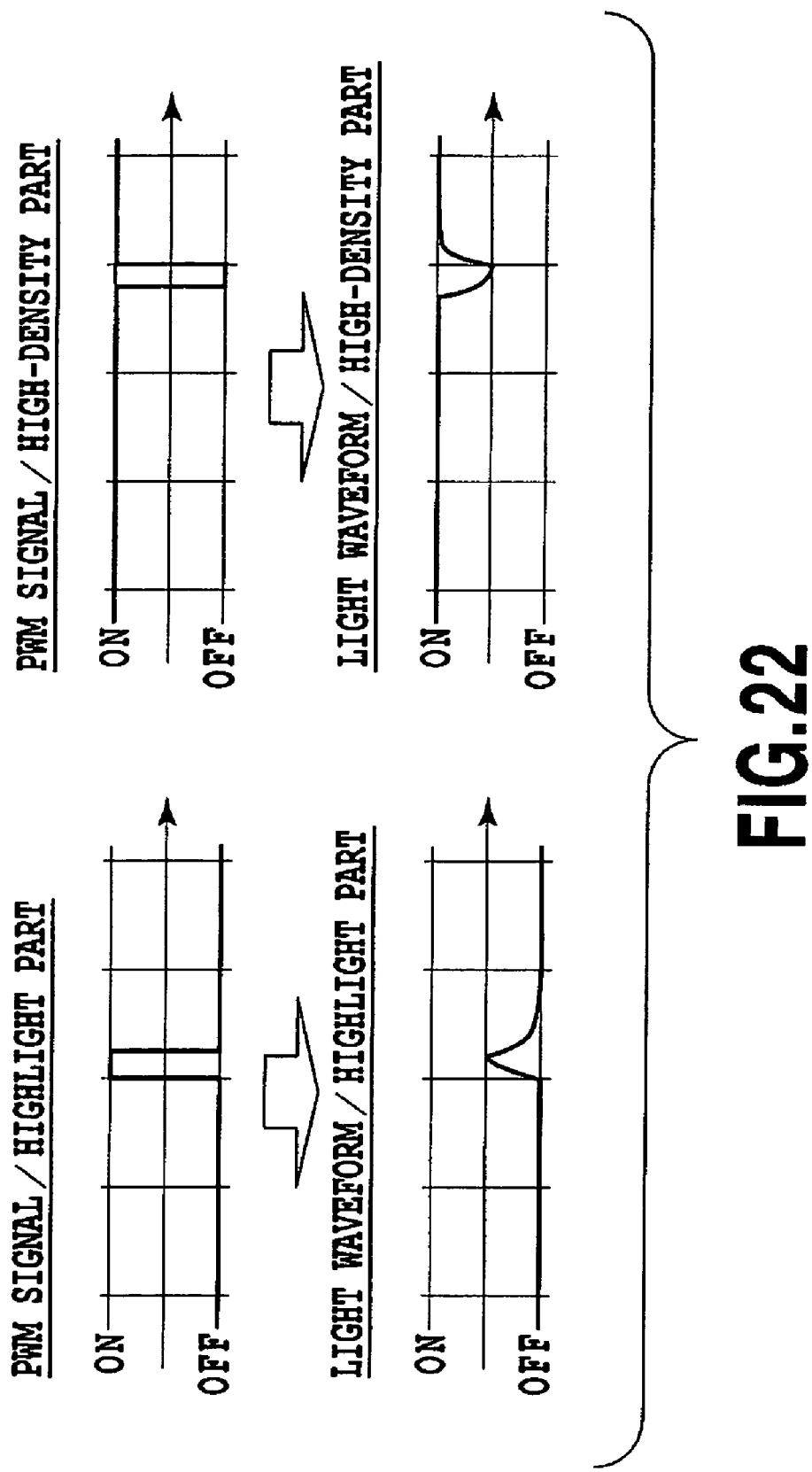
FIG. 22 is an illustration for explaining the characteristics of the semiconductor laser shown in FIG. 2.

A technique for correcting emission characteristics of a semiconductor laser, according to this embodiment, is first described. As shown in FIG. 20, an amount of emitting light (Laser Power) for each of input data of 00h to FFh (an index comprised of a hexadecimal number added with "h", which specifies a concentration of a pixel) is measured when each pixel is PWM-driven with the same signal value. A result of plotting the amount of emitting light to the input data is shown in FIG. 21. A line indicated by "a" in the diagram exhibits a linear relationship of the amount of emitting light to the input data, and therefore is ideal. As shown in FIG. 22, if a pulse width for turning on the laser or turning off the laser is short, a response is not sufficient and therefore a light waveform is deformed. In such a case, as shown as a line indicated by "b" in FIG. 21, because the laser is not turned on in the highlight region and not turned off in the high-density region, a linearity of the laser is far deviated from the ideal line.

In order to correct such laser driving, a technique for carrying out a correction with an LUT for one pixel is applicable. However, such an LUT correction for correcting a pulse width within one pixel may cause a problem on the reproducibility of gradation.

Figure 24:
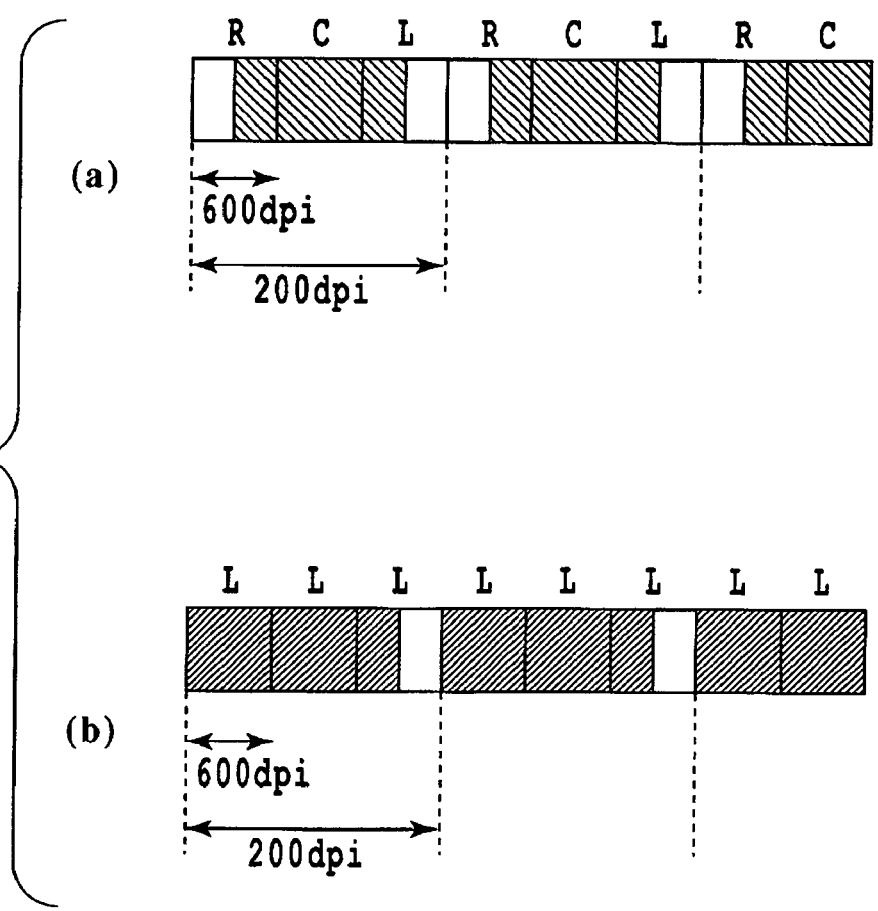
FIG. 24 is a diagram illustrating an image pattern formation.

This point is described first from the aspect of general image formation. For example, in the case of forming a screen with the number of 200 lines with 600 dpi, an image pattern is formed, assuming three pixels as one block (sub-matrix), as shown in FIG. 24. For example, FIG. 24 (a) is a pattern illustrating a sequential formation from a central pixel toward both ends, and a base point of a PWM formation is different among formation from a right-hand edge (R), from a center (C), and from a left-hand edge (L). FIG. 24 (b) shows a pattern illustrating a sequential formation from a left-hand pixel to a right-hand pixel, and all the pixels are formed using a left-hand edge (L) as the base point.

On the premise of such an image forming method, a problem arising when an image output is performed using a LUT for every pixel is shown using FIG. 25. FIG. 25 (a) shows an image pattern. FIG. 25 (b) shows a PWM pattern. When the output is performed using a semiconductor laser having emission characteristics as shown in FIG. 21 (b), a correction is carried out by using an LUT of which an inverse gamma characteristic is as shown in FIG. 25 (c). In such a case, a correction signal as shown in FIG. 25(d) is formed. When the correction signal is output using the semiconductor laser having the emission characteristics as shown in FIG. 21 (b), a light waveform as shown in FIG. 25 (e) is output.

In addition, the emission characteristics shown in FIG. 21 illustrate just an output amount of light at the time of inputting the same signal to all the pixels as shown in FIG. 20. In the case of combining a plurality of pixels to form an image as shown in FIG. 25, an effect of peripheral pixels is different even on a pixel having same 10h information such as a pixel indicated by "B" or "G" in FIG. 25. Specifically, the pixel indicated by "G" in FIG. 25 becomes an isolated pixel, and the pixel indicated by "A" in FIG. 25 has a condition of having a neighboring pixel on its left-hand side. In either case of "B" or "G" in FIG. 25, a peripheral pixel condition for contributing to a laser emission is different from that in the case of inputting the same image signal to all the pixels as shown in FIG. 20. That is, regardless of the use of the same semiconductor laser, the pixel indicated by "B" or "G" in FIG. 25 does not exhibit the gradation characteristics shown in FIG. 21.

Categorizing effects of right-hand and left-hand pixels of a pixel of interest (a pixel which is being categorized) into four to illustrate gradation characteristics results in diagrams shown in FIG. 26. The horizontal axis of FIG. 26 (a)-(d) shows concentration of a pixel of interest and the vertical axis of FIG. 26 shows duty ratio of the pulse width. FIG. 26 (a) shows the case of the absence of signals input to the right and left pixels, FIG. 26 (b) shows the case of the presence of a signal input only to the right pixel, FIG. 26 (c) shows the case of the presence of a signal input only to the left pixel, and FIG. 26 (d) shows the case of the presence of signals input to both right and left pixels. It can be appreciated that FIGS. 26 (a) to (d) exhibit different emission characteristics respectively. Specifically, the pixels "B" and "G" in FIG. 25 correspond to FIGS. 26 (a) and (b) respectively, and their final output waveforms become a pattern shown in FIG. 25 (e). Referring to FIG. 25 (e), "G" achieves a desired value, "D" exhibits a smaller value and "A+B" achieves a desired value, relative to the intended PWM signal shown in FIG. 25 (b).

If a highlight pixel is lighted adjacently to a formed pixel such as "A+B", a problem arises. That is, due to an excessive correction as shown in FIG. 25 (e), a large output difference arises between a gradation of a sub-matrix indicated by "D+E+F" and that by "A+B+C". For this reason, a tone jump occurs at a gradation point where the highlight pixel is adjacent to the formed pixel. Therefore, unless an LUT is switched correspondingly to each of the four patterns in FIG. 26, sufficient consistency cannot be held.

In this embodiment, rising and falling points of a PWM signal serving laser driving are detected and a time interval is monitored retroactive to the turn-off point from the rising point of the PWM signal. On the basis of the time interval, a correction amount is varied stepwise. Laser emission characteristics that are a main object to be corrected in this embodiment receive significant effects of peripheral pixels as shown in FIG. 26. Accordingly, in order to carry out an appropriate correction, a correction on a one-pixel basis is not effective. For this reason, by focusing on the relationship between the rising and the falling, specifically the turn-off time interval governing the emission characteristics of interest, a correction is carried out in accordance with the time interval. Alternatively, in consideration of the effects of peripheral pixels as shown in FIG. 26, a correction amount is determined which is appropriate in accordance with each of the four patterns shown in FIG. 26. That is, in this embodiment, an LUT is selected in accordance with the presence or absence of signals input to pixels around a pixel of interest. Therefore, the LUT is switched in accordance with each of the four patterns in FIG. 26. This enables an appropriate image correction to be carried out without a tone jump.

Embodiment 3

Figure 27:
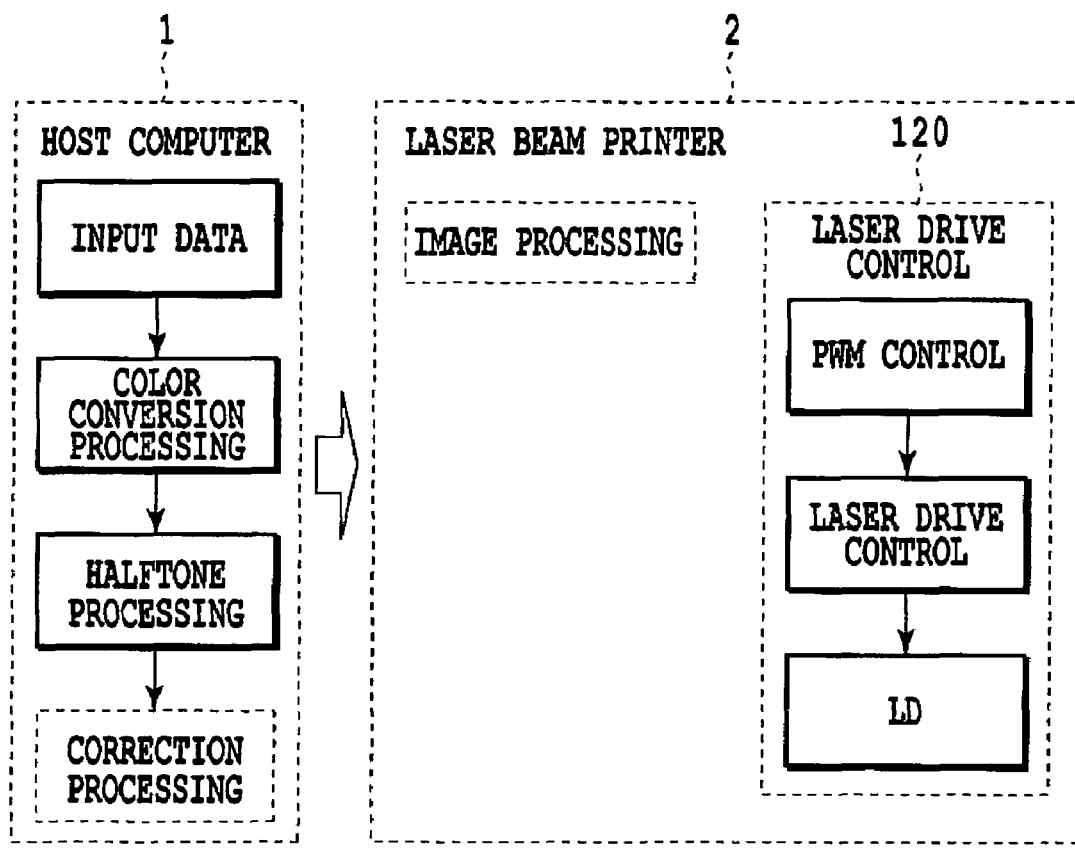
FIG. 27 is a block diagram illustrating a third embodiment of the present invention.

FIG. 27 illustrates the third embodiment of the present invention. This embodiment is different from the first and second embodiments and on the point that the correction processing is performed with a host computer 2.

The correction processing in this embodiment is not essentially different from the procedure in the correction processing in FIG. 4 according to the first embodiment. A pixel distance and a time interval between a rising and a falling are detected from image data before correction and a PWM signal, and then the image data and the PWM signal are corrected with a correction amount appropriate to the obtained detection amount, followed by subsequent steps.

Embodiment 4

Figure 28:
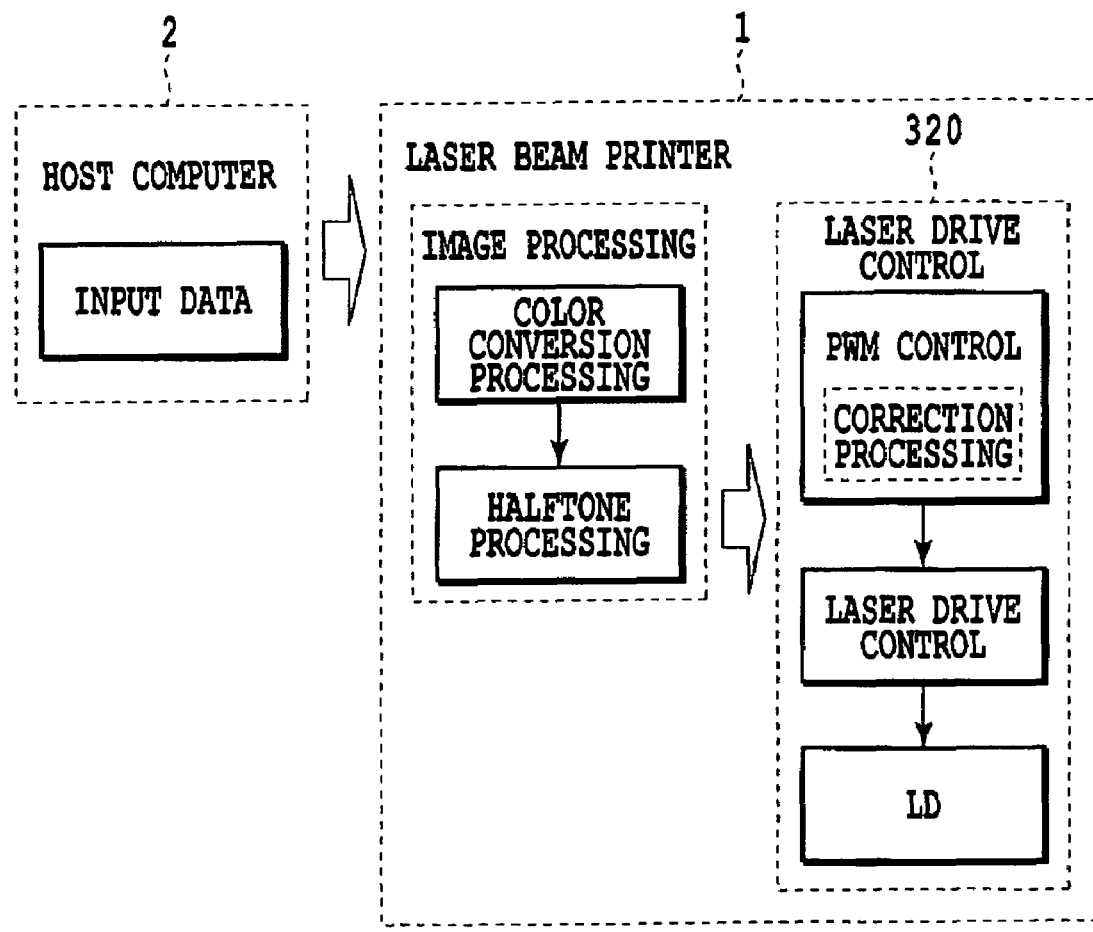
FIG. 28 is a block diagram illustrating a fourth embodiment of the present invention.

FIG. 28 illustrates the third embodiment 4 of the present invention. This embodiment is different from Embodiments 1 and 2 on the point that the correction processing is performed in a laser drive control 320.

Figure 29:
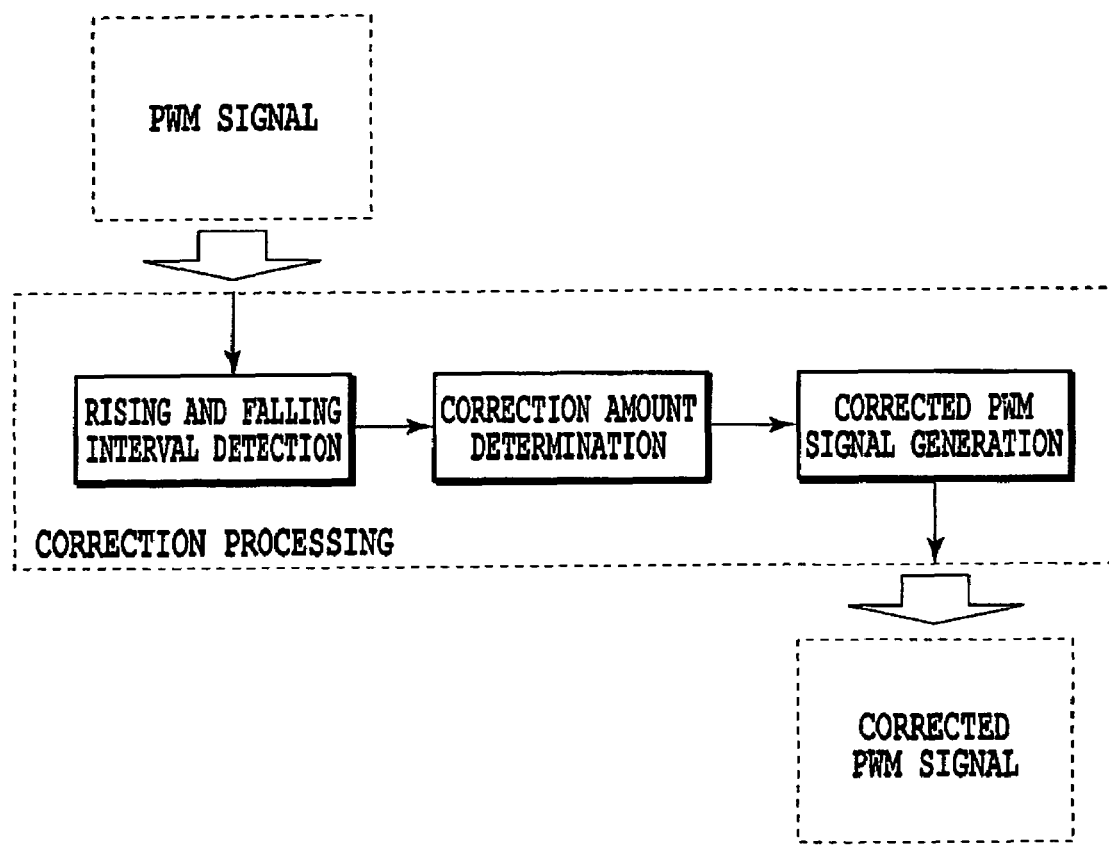
FIG. 29 is a block diagram illustrating respective elements of a laser drive control 220 shown in FIG. 28.

FIG. 29 illustrates a procedure of the correction processing of the laser drive control 320 of FIG. 28. A pixel distance and the time interval between a rising and a falling are detected from image data before correction and a PWM signal, and then the image data and the PWM signal are corrected with a correction amount appropriate to the obtained detection amount, followed by subsequent steps.

To describe FIG. 29 in more detail, a rising and a falling of a signal are detected in a PWM signal rising and falling interval detection, a time interval therebetween is obtained on the basis of a reference clock, a correction amount is determined on the basis of an LUT in a correction amount determination, and a corrected PWM signal is generated and output. In reference to FIG. 29, a method for detecting the rising and the falling after the PWM waveform has been formed is described; however, it should be appreciated that the correction processing can be performed at the time of digital data in the laser drive control as well.

Other Embodiments

In addition, the present invention may be applied to a system comprising a plurality of equipment (such as a host computer, an interface device, a reader, and a printer). Alternatively, the present invention may be applied to apparatus comprised of one piece of equipment (such as a copying machine, or a facsimile machine).

It will be obvious that the object of the present invention may also be accomplished as follows. That is, a recording medium onto which a software program code providing functions of the above-described embodiments is recorded is supplied to the system or the apparatus. Then, a computer (a CPU or an MPU) in the system or the apparatus reads out and executes the program code stored in the recording medium.

In this case, the program code itself read from the recording medium provides the functions of the above-described embodiments. Therefore, the present invention comprises the recording medium in which the program code is stored.

As the recording medium for supplying the program code, for example, the following medium may be used, i.e., a floppy (registered trademark) disk, a hard disk, an optical disk, a magnetic optical disk, a CD-ROM, a CD-R, a magnetic tape, a nonvolatile memory, or a ROM.

Also, it will be obvious that by executing with the computer the program code having been read, the functions of the above-described embodiment are not only provided, but the following things also become possible. That is, under the instruction of the program code, an OS (operating system) running on the computer performs part or all of actual processing. Consequently, performing the processing enables the functions of the above-described embodiments to be provided.

Furthermore, the program code having been read from the recording medium is written into a memory provided on a function expansion board inserted into the computer or in a function expansion unit connected to the computer. Then, under the instruction of the program code, a CPU or the like provided on the function expansion board or in the function expansion unit performs the actual processing. Consequently, it will be obvious that the case where performing the processing enables the functions of the above-described embodiments to be provided is included.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-221586, filed Jul. 29, 2005, which is hereby incorporated by reference herein in its entirety.

What is claimed is:

1. A semiconductor laser drive control device for driving and controlling a semiconductor laser on a basis of image data, comprising:
   correcting means for increasing an amount of emitting light from the semiconductor laser in a highlight region and decreasing an amount of emitting light from the semiconductor laser in a high-density region; and
   drive controlling means for driving and controlling the semiconductor laser on a basis of a pixel corrected by the correcting means, wherein the correcting means includes obtaining means for obtaining a time interval from a time point commencing when laser emission is stopped to a time point ending when laser emission is started while a laser beam emitted from the semiconductor laser is scanned, and wherein the correcting means sequentially varies a correction amount in accordance with the time interval obtained by the obtaining means.

2. The semiconductor laser drive control device according to claim 1, wherein the correcting means carries out different corrections for emission characteristics of the semiconductor laser for the highlight region and the high-density region respectively.

3. The semiconductor laser drive control device according to claim 1, wherein the correcting means sequentially varies a correction amount in accordance with a time interval in reference to a look-up table correlating the time interval from a time point when a laser emission is stopped to a time point when a laser emission is started with a sequentially varying correction amount with respect to the time interval, while a laser beam emitted from the semiconductor laser is scanned.

4. The semiconductor laser drive control device according to claim 3, wherein a correction of a pixel of interest in reference to the look-up table by the correcting means is carried out by using the look-up table switched in accordance with a presence or an absence of a pixel around the pixel of interest.

5. The semiconductor laser drive control device according to claim 1, wherein a correction for correcting a delay arising from emission characteristics of the semiconductor laser in the highlight region and the high-density region, and a correction for basic characteristics of electrophotography in which the laser beam is scanned are simultaneously carried out.

6. The semiconductor laser drive control device according to claim 1, wherein the correcting means carries out a correction for the image data.

7. The semiconductor laser drive control device according to claim 1, wherein the correcting means carries out a correction for a laser driving pulse width signal.

8. The semiconductor laser drive control device according to claim 1, wherein the correcting means carries out a correction for a laser power.

* * * * *